United States Patent [19]
Maegawa

[11] Patent Number: 5,966,386
[45] Date of Patent: Oct. 12, 1999

[54] MULTIMEDIA NETWORK SYSTEM AND METHOD OF COMMUNICATION OF SAME

[75] Inventor: Hirotoshi Maegawa, Tokyo, Japan

[73] Assignee: Digital Vision Laboratories Corp., Tokyo, Japan

[21] Appl. No.: 08/810,008

[22] Filed: Mar. 4, 1997

[30] Foreign Application Priority Data

Mar. 5, 1996 [JP] Japan ................................. 8-047822
Oct. 4, 1996 [JP] Japan ................................. 8-264724

[51] Int. Cl.⁶ ......................................................... H04H 1/00
[52] U.S. Cl. ........................................... 370/486; 370/522
[58] Field of Search .................................... 370/486, 487, 370/489, 490, 522; 348/3, 7, 12, 13; 455/4.2, 5.1

[56] References Cited

U.S. PATENT DOCUMENTS

| | | | |
|---|---|---|---|
| 5,208,665 | 5/1993 | McCalley et al. | 455/5.1 |
| 5,475,740 | 12/1995 | Biggs, Jr. et al. | 348/3 |
| 5,572,517 | 11/1996 | Safadi | 348/13 |
| 5,625,405 | 4/1997 | DuLac et al. | 348/7 |
| 5,627,836 | 5/1997 | Conoscenti et al. | 370/486 |
| 5,638,426 | 6/1997 | Lewis | 348/13 |
| 5,815,195 | 9/1998 | Tam | 348/7 |

*Primary Examiner*—Chi H. Pham
*Assistant Examiner*—Frank Duong
*Attorney, Agent, or Firm*—Armstrong, Westerman, Hattori, McLeland, & Naughton

[57] ABSTRACT

A service organizer node 30 transmits mediate information indicating contents of a service to be provided to a mediator node 12. A consumer node 20 transmits the data requesting the mediate information of the service organizer node 30 to the mediator node 12. The mediator node 12 transmits the mediate information to the consumer node 20 in response to a request from the consumer node 20. The consumer node 20 transmits the data indicating the service to be provided to the service organizer node 30. The service organizer node 30 transmits the program module etc. for realizing the service to the consumer node 20 to provide the requested service.

25 Claims, 21 Drawing Sheets

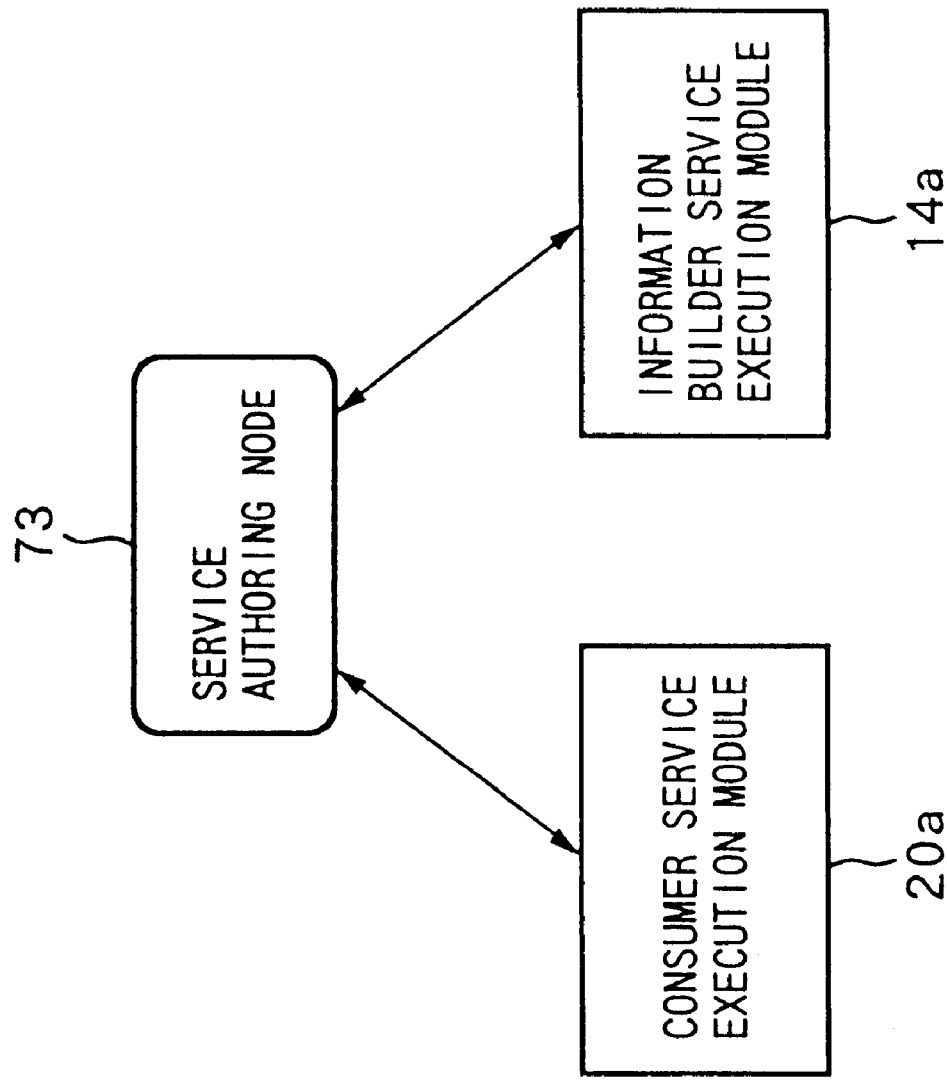

MULTIMEDIA NETWORK SYSTEM AND METHOD OF COMMUNICATION OF SAME

BACKGROUND OF THE INVENTION

1. Field of the Invention

The present invention relates to a multimedia network system and a method of multimedia communication with which provision of information and provision of services can be efficiently and systematically carried out.

2. Description of the Related Art

Multimedia network systems which integrate computer, broadcasting, publishing, and other media are now being researched and developed.

The multimedia network systems which have been proposed up to now have been comprised by a large number of terminals for consumers utilizing so-called multimedia computers etc, and information and service organizers for providing multimedia information such as audio and video data and text data or providing services such as banking or shopping connected via a digital communication network such as an integrated services digital network (ISDN) communication network, cable television (CATV) communication network, and asynchronous transfer mode (ATM) communication network with data being transmitted among these nodes.

In such a multimedia network system, a provider of a service stores content and provides the same to the network, while a consumer connects to the server of the provider to receive the provision of the information. This is the same for both the Internet and other networks such as CATV communication networks. Alternatively, the network provider has the function of providing of a service and realizes a similar service. The contents are expressly stored in the server and then provided to the network.

However, as the configuration of the multimedia network system becomes more complex and sophisticated, the number of the types of the nodes having different functions (network elements) is increased. For example, the present day multimedia network systems do not distinguish between an information provider providing multimedia information and a service organizer providing a service and treat them in the same way. However, in the provision of multimedia information, for example, audio and video information, the characterizing feature is that the amount of data transmitted from the provider side toward the consumer is enormous while the data transmitted from the consumer toward the provider is limited to the data for designating the information etc. so the amount of the data is very small. On the other hand, in the provision of a service, the characterizing feature is that the total amount of the transmitted data is small in comparison with the case of provision of multimedia information, but it is necessary to transmit the data in two directions between the service organizer and the consumer. Is the processing contents of nodes having respective characterizing features and performing different roles in this way are handled without distinguishing between them, the control of the communication among the nodes of the multimedia network system becomes complex and the systematic provision of multimedia information and services becomes difficult.

Further, for example, in the case of a video-on-demand (VOD) system for sending audio and video data (VOD data) in response to a request of a consumer, a VOD data generating apparatus for generating the VOD data and a VOD data transmitting apparatus for transmitting the generated VOD data to the viewers become necessary. In this way, the realization of complex and sophisticated data processing and communication processing sometimes requires that a plurality of nodes which are connected to each other via the multimedia network system be made to operate in a cooperative and coordinated manner (cooperate) to realize a single function. however, the multimedia network systems proposed at present do not function to support cooperative and coordinated operations of a plurality of nodes. For this reason, it is necessary to provide all of the constituent elements required by the data and service organizing systems including a plurality of nodes, and it is difficult for a plurality of data and service organizing systems to share hardware resources.

Further, it is conceivable that there will become required to connect a plurality of multimedia network systems with each other to constitute a further larger scale network system. In such a case, not all of the plurality of multimedia network systems will always be constituted using the same communication networks. For example, it may become necessary to connect a multimedia network system using for example a CATV communication network or ISDN network etc. and a multimedia network system using an ATM communication network with each other.

SUMMARY OF THE INVENTION

An object of the present invention is to provide a multimedia network system and a method of multimedia communication with which a plurality of types of nodes which have respectively characterizing features and perform different roles can be separately handled and the systematic provision of multimedia information and services is enabled.

Further, another object of the present invention in to provide a multimedia network system and a method of multimedia communication with which a data and service organizing system supporting the cooperative and coordinated operation of a plurality of nodes connected to each other via a communication network and making these plurality of nodes cooperate to provide a single data and/or service function can be realized and, in addition, with which it is possible for a plurality of data and/or service organizing systems to share hardware resources.

Further, still another object of the present invention is to provide a multimedia network system and a method of multimedia communication with which it is possible to connect a plurality of multimedia network systems in which nodes are connected to each other by using different communication networks so as to construct a further larger scale multimedia network system and, in addition, with which it is possible to realize functions for this larger scale multimedia network system as a whole similar to the case where they are contained in a single multimedia network system.

Further, another object of the present invention is to provide a multimedia network system and a communication method of a configuration in which the service organizer mainly provides the management functions such as customer management, user authentication, and billing and makes the storage of content functionally independent.

Further, still another object of the present invention is to provide a multimedia network system and a method of multimedia communication with which an information providing service can be realized on a network comprising a plurality of servers for storing content which exist in a mixed manner.

Further, another object of the present invention is to provide a multimedia network system and a method of multimedia communication with which the function of searching for the location and content of a service is made independent from the service organizer and this function can be realized in a wide range.

Further, still another object of the present invention is to provide a multimedia network system and a method of multimedia communication with which the flow of the data from the generation of the content to the storage, delivery, and consumption can be systematized.

Further, still another object of the present invention is to provide a multimedia network system and a method of multimedia communication with which the provision of a service by collaboration and coordination among the same type of network constituent elements among the consumers or among the providers is enabled.

To attain the above objects, the multimedia network system according to the present invention is a multimedia network system wherein a plurality of data processing means transmit a plurality of types of data via a communication network, in which the plurality of data processing means includes information providing means for providing a first type of mediate information for indicating the contents of the data to be provided and data in accordance with request information from the communication network to another data processing means via the communication network; service organizing means for providing the first type of mediate information for indicating the contents of the services which are provided and a service in accordance with the request information from the communication network to another data processing means via the communication network; mediating means for receiving the first type of mediate information provided by the information providing means and the service organizing means via the communication network and mediating the received first type of mediate information and a second type of mediate information containing information indicating the locations of the information providing means and the service organizing means to another data processing means via the communication network; and information consuming means for transmitting request information indicating the requested data and service or one of the same to another data processing means via the communication network based on the first type of mediate information and the second type of mediate information autonomously provided by the information providing means, the service organizing means, and the mediating means or the first type of mediate information and the second type of mediate information provided by them in accordance with a request of another data processing means and utilizing the data provided from the other data processing means via the communication network in accordance with the transmitted request information.

Further, in the multimedia network system of the present invention, preferably the mediating means further mediates request information received from the information consuming means via the communication network to the information providing means.

Further, in the multimedia network system of the present invention, preferably two or more information providing means cooperate and constitute an information providing unit providing the data.

Further, in the multimedia network system of the present invention, preferably the mediating means further mediates the data transmitted in an internal portion of the information processing unit and among the information processing units.

Further, in the multimedia network system of the present invention, preferably two or more service organizing means cooperate and constitute a service organizing unit providing a service.

Further, in the multimedia network system of the present invention, preferably the mediating means further mediates the data transmitted in an internal portion of a service organizing unit and among service organizing units.

Further, in the multimedia network system of the present invention, preferably two or more mediating means cooperate and constitute a mediating unit mediating the second type of mediate information; and the mediating means constituting a mediating unit transmit the first type of mediate information and the second type of mediate information among themselves.

Further, in the multimedia network system of the present invention, preferably two or more information consuming means cooperate and constitute a data consuming unit consuming the data.

Further, in the multimedia network system of the present invention, preferably the data processing means includes an information building means connected with the information providing means via the communication network and for generating the data to be provided by the information providing means via the communication network or directly.

Further, in the multimedia network system of the present invention, preferably provision is further made of a network providing means for controlling the communication of the communication network and providing the network connection among the data processing means.

Further, in the multimedia network system of the present invention, preferably the plurality of data processing means provide at least one function among an information providing function, information consuming function, information mediation function, service organizing function, information building function, and network function.

The multimedia network system according to the present invention is comprised of a plurality of nodes which are connected to each other via a communication network such as an ISDN network, ATM network, or the like among which nodes multimedia information including audio and video data, text data, etc. is transmitted and multimedia services are provided.

In the multimedia network system according to the present invention, the plurality of nodes include, for example, information providing means for providing multimedia data and services according to the multimedia data or one of the same (data and/or service) with respect to the consumer, information mediating means for mediating the contents of the data and service which the consumer can be provided with, and information consuming.

The information providing means outputs for example the first type of mediate information for indicating the contents of the data to be provided to the consumer to the mediating means via the communication network. Further, the information providing means receives request information indicating the data requested by the information consuming means etc. via the mediating means and the communication network and provides the data to the information consuming means via the communication network in accordance with the received request information.

The service organizing means outputs the first type of mediate information indicating the contents of the service to be provided to the consumer to the mediating means via the communication network. Further, the service organizing means receives request information indicating the service etc. requested by the information consuming means via the mediating means and the communication network and provides the service to the information consuming means via the communication network in accordance with the received request information.

The mediating means transmits the first mediate information, secondary information generated based on the first mediate information, and a second type of mediate information including the information on the location etc. of the information providing means and the service organizing means obtained from the management information etc. of the communication network to the information consuming means via the communication network in accordance with for example a request of the information consuming. Further, the mediating means receives the request information from the information consuming means via the communication network and transmits the received request information to the information providing means via the communication network.

The information consuming means provides the data and service provided from the information providing means via the communication network for the use of the consumer.

Further, the method of multimedia communication according to the present invention is a method of multimedia communication for transmitting a plurality of types of data via a communication network among a plurality of nodes, in which one or more nodes of the plurality of nodes provides a first type of mediate information for indicating the contents of the data to be provided and data in accordance with request information from the communication network to another node via the communication network; one or more nodes among the plurality of nodes provides a first type of mediate information for indicating the contents of the service to be provided and service in accordance with the request information from the communication network to another node via the communication network; one or more nodes of the plurality of nodes receives the provided first type of mediate information via the communication network and mediates the received first mediate information and the second type of mediate information containing information indicating the location of the node for providing the data and service to another node via the communication network; and one or more nodes of the plurality of nodes transmits request information indicating the requested data and service or one of the same to another node via the communication network based on the first type of mediate information and the second type of mediate information autonomously provided by the other node or provided by it in accordance with a request of the other node and utilizes the data provided from the other node via the communication network in accordance with the transmitted request information.

Further, in the method of multimedia communication of the present invention, preferably the node performing the mediation further mediates the request information received from the node utilizing the data via the communication network to the node providing the data.

Further, in the method of multimedia communication of the present invention, preferably two or more nodes cooperate and constitute an information providing unit providing the data.

Further, in the method of multimedia communication of the present invention, preferably the node performing the mediation further mediates the data transmitted in the internal portion of an information processing unit and among information processing units.

Further, in the method of multimedia communication of the present invention, preferably two or more nodes providing a service cooperate and constitute a service organizing unit providing a service.

Further, in the method of multimedia communication of the present invention, preferably the node performing the mediation further mediates the data transmitted in the internal portion of a service organizing unit and among service organizing units.

Further, in the method of multimedia communication of the present invention, preferably two or more nodes performing mediation constitute a mediating unit mediating the second type of mediate information, and the nodes constituting a mediating unit transmit the first type of mediate information and the second type of mediate information among each other.

Further, in the method of multimedia communication of the present invention, preferably two or more nodes utilizing data cooperate and constitute a data utilization unit utilizing data.

Further, in the method of multimedia communication of the present invention, preferably a node performing the data processing includes an information building node which is connected to a node providing data via the communication network and generates the data to be provided by the node providing the data via the communication network or directly.

Further, in the method of multimedia communication of the present invention, preferably the node performing the data processing includes a network node providing a network connection among nodes for controlling the communication of the communication network and performing the data processing.

Further, in the method of multimedia communication of the present invention, preferably the plurality of nodes performing the data processing provide at least one function among an information providing function, information consuming function, data mediation function, service organizing function, information building function, and network function.

According to the multimedia network system and the method of multimedia communication of the present invention, it is possible to separately handle a plurality of types of nodes which have respectively characterizing features and perform different roles and possible to systematically provide multimedia information and services.

Further, according to the multimedia network system and the method of multimedia communication of the present invention, it is possible realize a data and/or service organizing system supporting the cooperative and coordinated operation of a plurality of nodes connected to each other via a communication network and making these plurality of nodes cooperate to provide a single data and/or service function and, in addition, it is possible for a plurality of data and/or service organizing systems to share hardware resources.

Further, according to the multimedia network system and the method of multimedia communication of the present invention, it is possible to connect a plurality of multimedia network systems in which nodes are connected to each other by using different communication networks so as to construct a further larger scale multimedia network system and, in addition, it is possible to realize functions for this larger scale multimedia network system as a whole similar to the case where they are contained in a single multimedia network system.

Further, according to the multimedia network system and the method of multimedia communication of the present invention, it is possible to configure the system so that the service organizer mainly provides the management functions such as customer management, user authentication, and billing and to make the storage of content functionally independent.

Further, according to the multimedia network system and the method of multimedia communication of the present invention, it is possible to realize an information serving service on a network comprising a plurality of servers for storing content which exist in a mixed manner.

Further, according to the multimedia network system and the method of multimedia communication of the present invention, it is possible to make the function of searching for the location and content of a service independent from the service organizer and realize this function in a wide range.

Further, according to the multimedia network system and the method of multimedia communication of the present invention, it is possible to systematize the flow of the data from the generation of the content to the storage, delivery, and consumption.

Further, according to the multimedia network system and the method of multimedia communication of the present invention, it is possible to provide a service by collaboration and coordination among the same type of network constituent elements among the consumers or among the providers.

BRIEF DESCRIPTION OF THE DRAWINGS

These and other objects and features of the present invention will become clearer from the following description of preferred embodiments given with reference to the accompanying drawings, wherein:

FIG. 21 is a view of a method for realizing the service execution modules shown in FIG. 18 in a multimedia network system.

DESCRIPTION OF THE PREFERRED EMBODIMENTS

First Embodiment

Below, an embodiment of the present invention will be explained.

Figure 1:
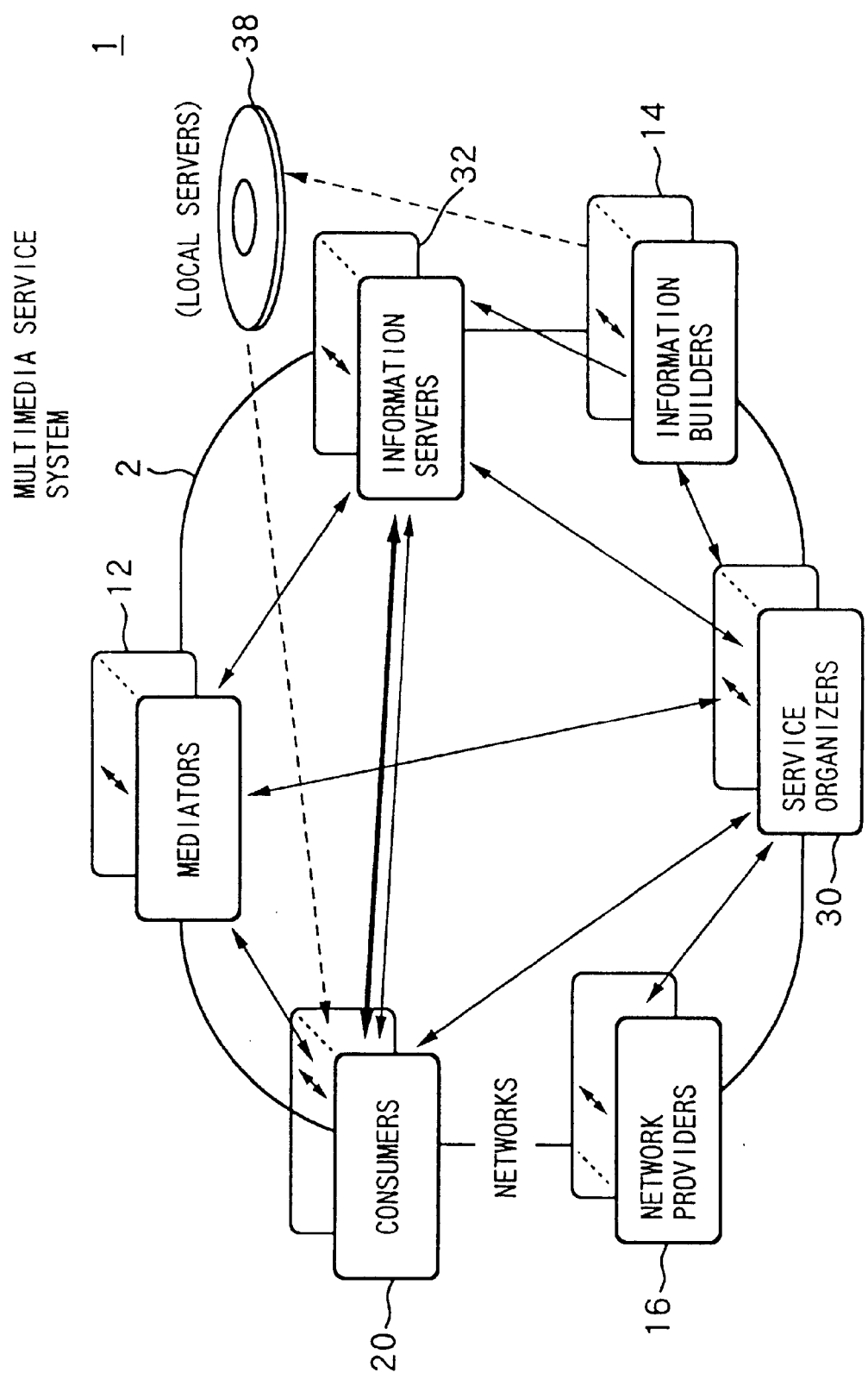
FIG. 1 is a view of the configuration of a multimedia network system according to an embodiment of the present invention.

FIG. 1 is a view Of the configuration of the multimedia network system according to the present invention in the present embodiment.

Note that, the present multimedia network system integrates computer, broadcasting, publishing and other media.

As shown in FIG. 1, a multimedia network system 1 is comprised of a plurality of nodes including mediator nodes 12, information builder nodes 14, network provider nodes 16, and consumer nodes 20, which transmit data among each other via a communication network 2 as indicated by the arrows in FIG. 1. Further, the consumer nodes 20 and information builder nodes 14 can substantially have communication by means of local servers 38.

Note that, below, when reference is made to the term "node", it is not limited to a constituent element of the physical network and may be an application module in a node connected to for example the communication network 2.

The communication network 2 is composed of, for example, an ISDN communication network, ATM communication network, data communication network, or a LAN of Ethernet and transmits the data among the nodes included in the multimedia network system 1.

A network provider node 16 performs the processing for the control of communication with respect to the communication network 2 and provides the network infrastructure for the nodes of the multimedia network system 1.

Figure 2:
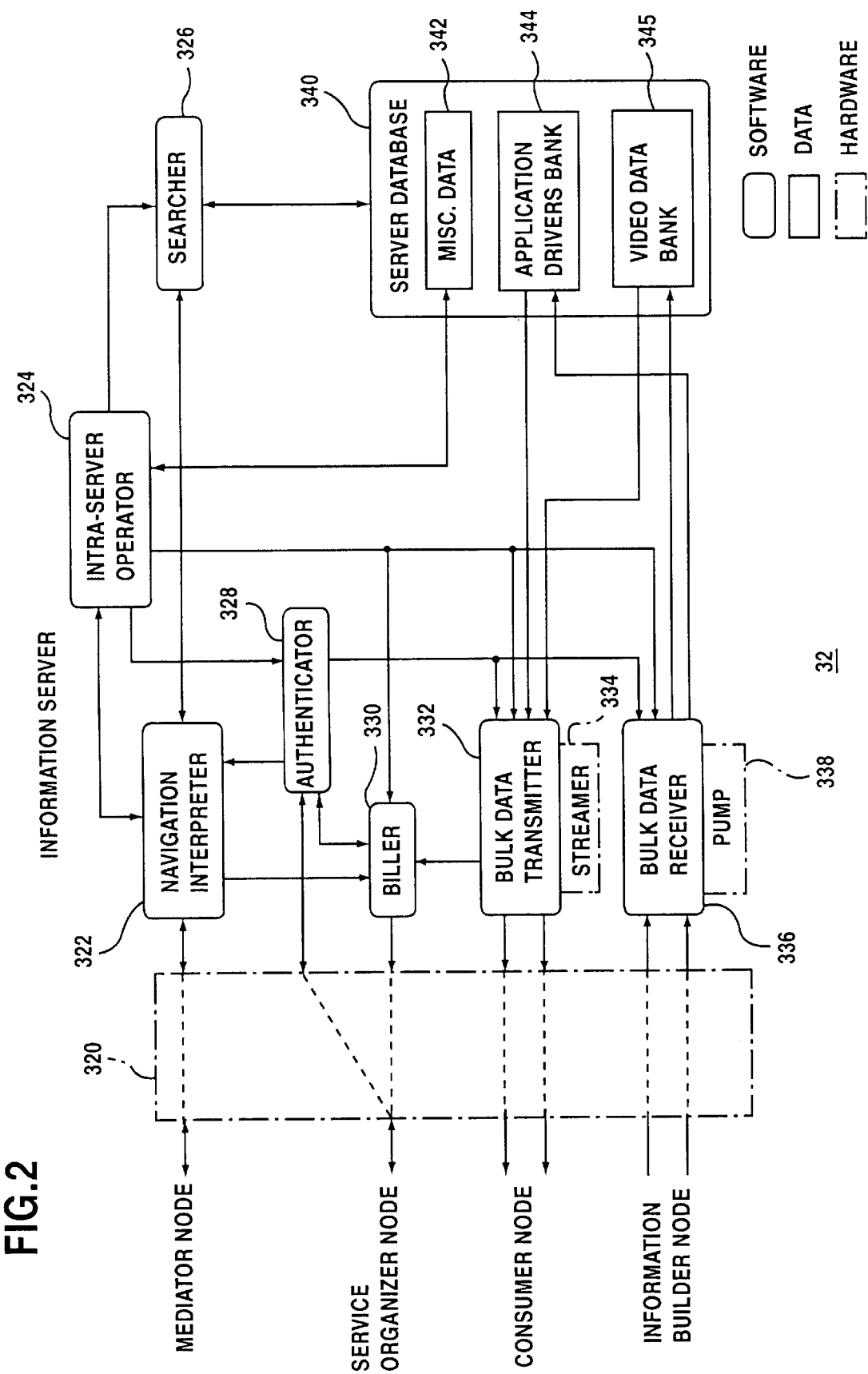
FIG. 2 is a view of the configuration of an information server node shown in FIG. 1.

FIG. 2 is a view of the configuration of an information server node 32 shown in FIG. 1.

As shown in FIG. 2, the node is constituted by hardware such as a multiple network interface (MNIF) 320, a streamer 334, and a pump 338 and software such as a navigation interpreter 322, an intra-server operator 324, a searcher 326, an authenticator 328, a biller 330, a bulk data transmitter 332, a bulk data receiver 336, and a server data base 340. The server data base 340 is constituted by miscellaneous data 342, an application drivers bank 344, a video data bank 346, etc.

The navigation interpreter 322 interprets a navigation request input from a mediator node 12 shown in FIG. 1 and outputs a search instruction to the searcher 326.

The searcher 326 searches for the predetermined information from the server data base 340 in accordance with the search instruction.

The intra-server operator 324 performs the overall control over the constituent elements of the information server node 32.

The bulk data receiver 336 outputs the information input from an information builder node 14 shown in FIG. 1 to the server data base 340 via for example the multiple network interface 320 to make it store the same, The bulk data transmitter 332 for example outputs the information obtained from the server data base 340 by the search processing by the searcher 326 to a consumer node via the multiple network interface 320.

The authenticator 328 receives the use request data from the requesting device such as a consumer node via the multiple network interface 320 and sends the request data signed by itself and the encryption key signed by the authentication organization to the requesting device. The requesting device adds for example a digital signature to each of the order data and payment instruction data containing information such as data requesting utilization, encrypts the same by the received encryption key, and outputs this to the authenticator 328. The authenticator 328 decodes the data from the requesting device by the decoding key and when confirming from the digital signature that the order data is proper, outputs the result of confirmation to the navigation interpreter 322, biller 330, bulk data transmitter 332, and or bulk data receiver 336. The navigation interpreter 322, biller 330, bulk data transmitter 332, and the bulk data receiver 336 execute a series of processing concerning the provision of information when this confirmation result is input.

The biller 330 performs the predetermined billing processing based on the above-mentioned order data and payment instruction data when for example the confirmation result is input from the authenticator 328. At this time, when a usage-based system is adopted, the biller 330 performs for example the billing processing for every title of movie, news, etc. or micropayment processing for billing for every scene or every page together with the biller 210 of the consumer node 20 shown in FIG. 9.

The information server node 32 is for example a VOD system which provides a realtime data stream such as VOD data or a service which is necessary for the delivery of the VOD data to the consumer node 20.

Note that the realtime data is transmitted from the information server nodes 32 to the consumer nodes 20 via the communication network 2 and that the data for realizing a service function relating to the provision of data is transmitted between the information server nodes 32 and the consumer nodes 20.

Further, when an information server node 32 and a service organizer node 30 operate cooperatively for realizing a service function relating to the provision of data, the data required for the cooperative operation for realizing the service function relating to the provision of data is transmitted between the information server node 32 and the service organizer node 30 via the communication network 2.

Further, the mediate data (mediate information) for indicating the content of the data stream provided by an information server node 32 is transmitted from the information server node 32 to a mediator node 12 via the communication network 2. Further, in general, the request data (request information) for designating the requested data stream is transmitted from a consumer of a consumer node 20 to a information server node 32. Further, where a mediator node 12 is made to act as a relay unit, the request data (request information) for designating the data stream requested by the consumer of the consumer node 20 to the information server node 32 is transmitted from the consumer node 20 to the mediator node 12 and then transmitted to the information server node 32.

Figure 6:
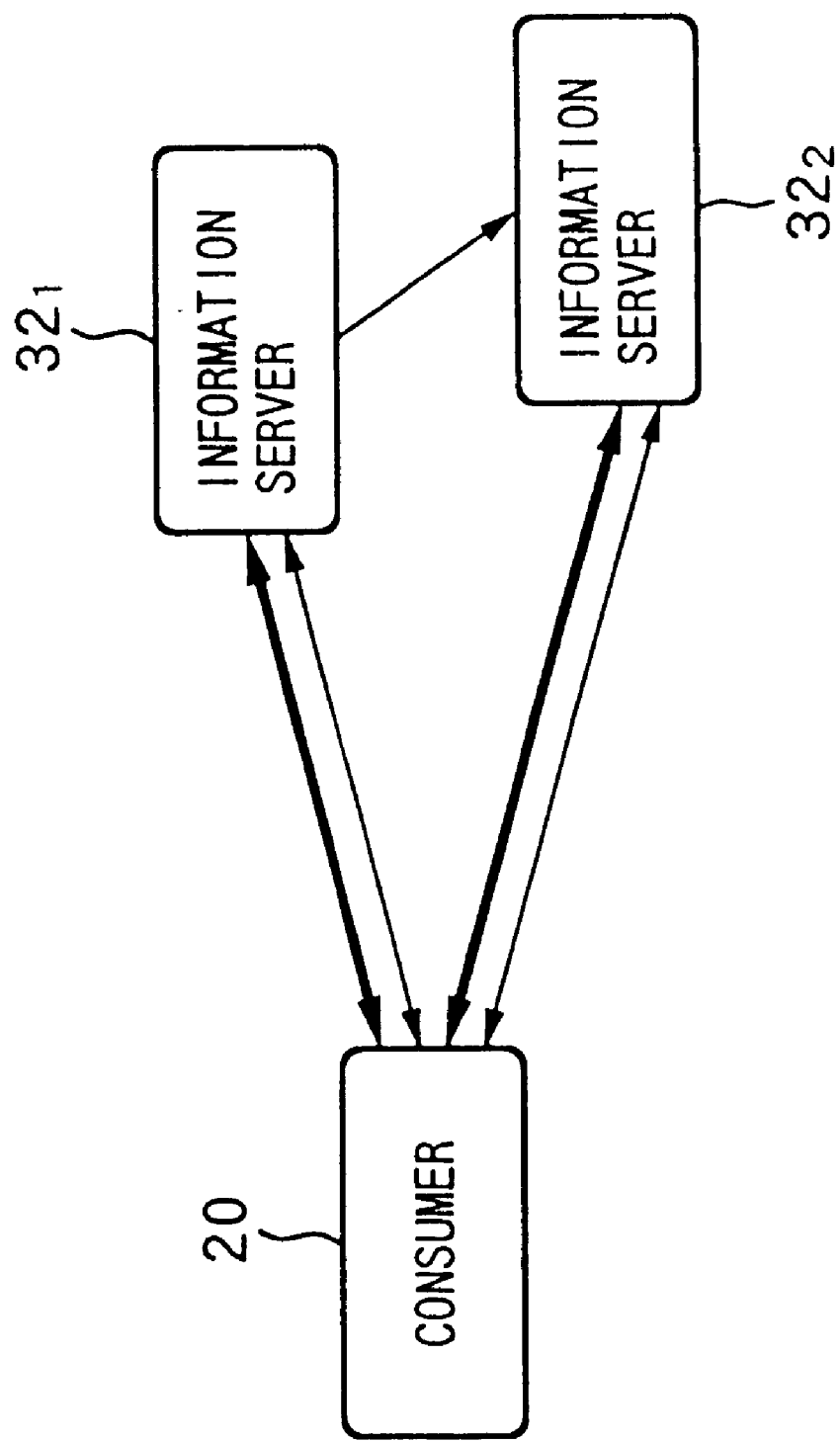
FIG. 6 is a view of a case where a function is consigned to another information server node when an information server node approaches the limit of its capacity.

Further, where the information server function is constituted by, for example, as shown in FIG. 6, a plurality of information server nodes for delivering VOD data to the consumer nodes 20 or is an information processing unit which disperses the service processing at busy periods, the data for achieving a cooperative and coordinated operation among the devices in one information processing unit or the data for achieving a cooperative and coordinated operation among the devices among several information processing units are further transmitted between the mediator nodes 12 and the information processing units. Note that, the VOD data is provided by the information builder nodes 14.

The local server 38 records the data stream provided by the information builder nodes 14 on a recording medium such as a magnetic recording medium, for example, a digital video tape, or a magneto-optic disk and provides the same to the consumer nodes 20.

The information builder nodes 14 supply or update the data or service to be provided by the service organizer nodes 30, the information server nodes 32, and the local servers 38.

Figure 3:
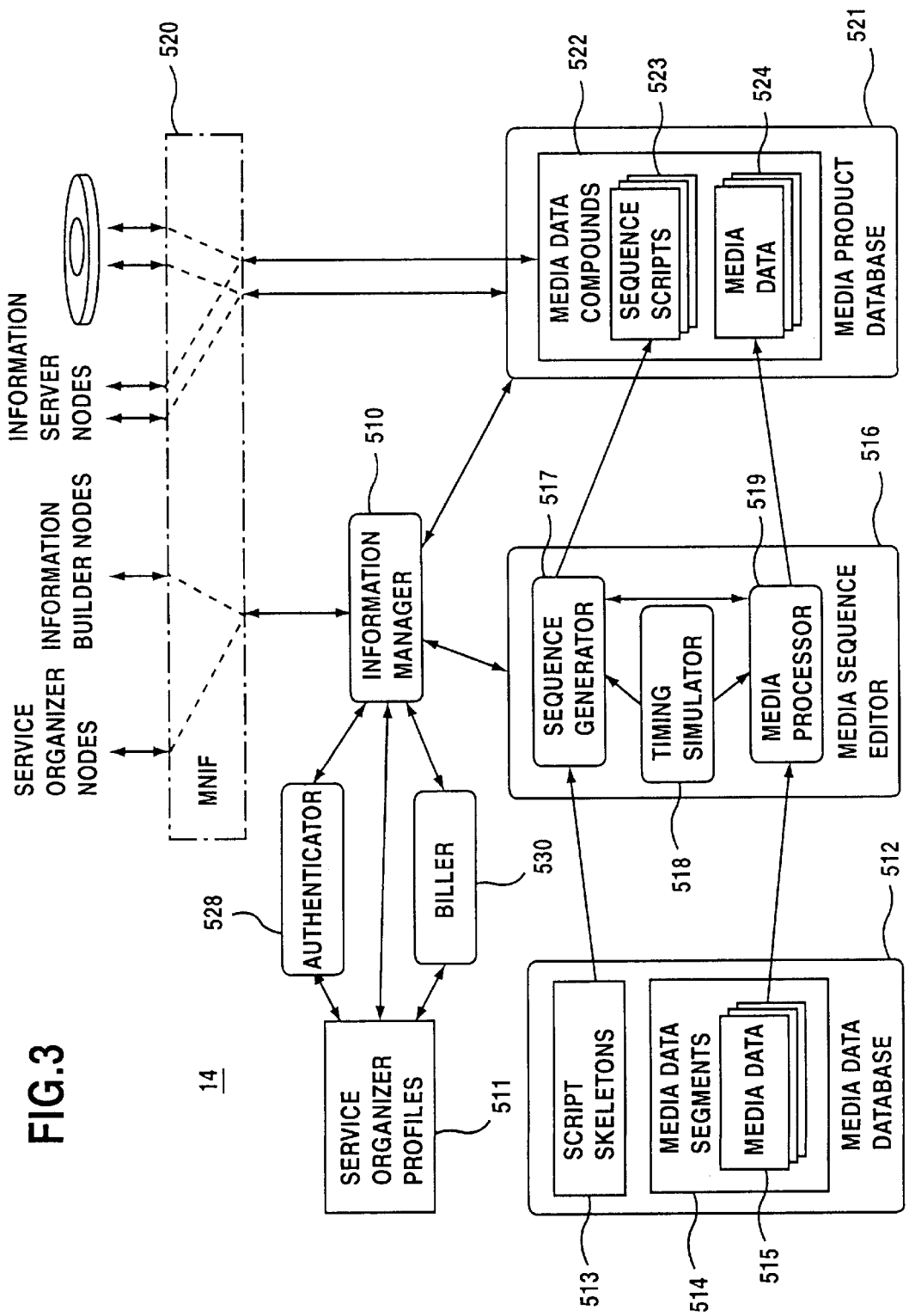
FIG. 3 is a view of the configuration of an information builder node shown in FIG. 1.

FIG. 3 is a view of the configuration of an information builder node 14.

As shown in FIG. 3, the information builder node 14 has an information manager 510, service organizer profiles 511, a media data database 512, a media sequence editor 516, a multiple network interface 520, a media product database 521, an authenticator 528, and a biller 530.

The media data database 512 is provided with script skeletons 513 and media data segments 514, Media data 515 is contained in the media data segments 514.

The media sequence editor 516 is provided with a sequence generator 517, a timing simulator 518, and a media processor 519.

The media product database 521 is provided with a media data compounds 522. Sequence scripts 523 and media data 524 are contained in media data compounds 522.

Figure 4:
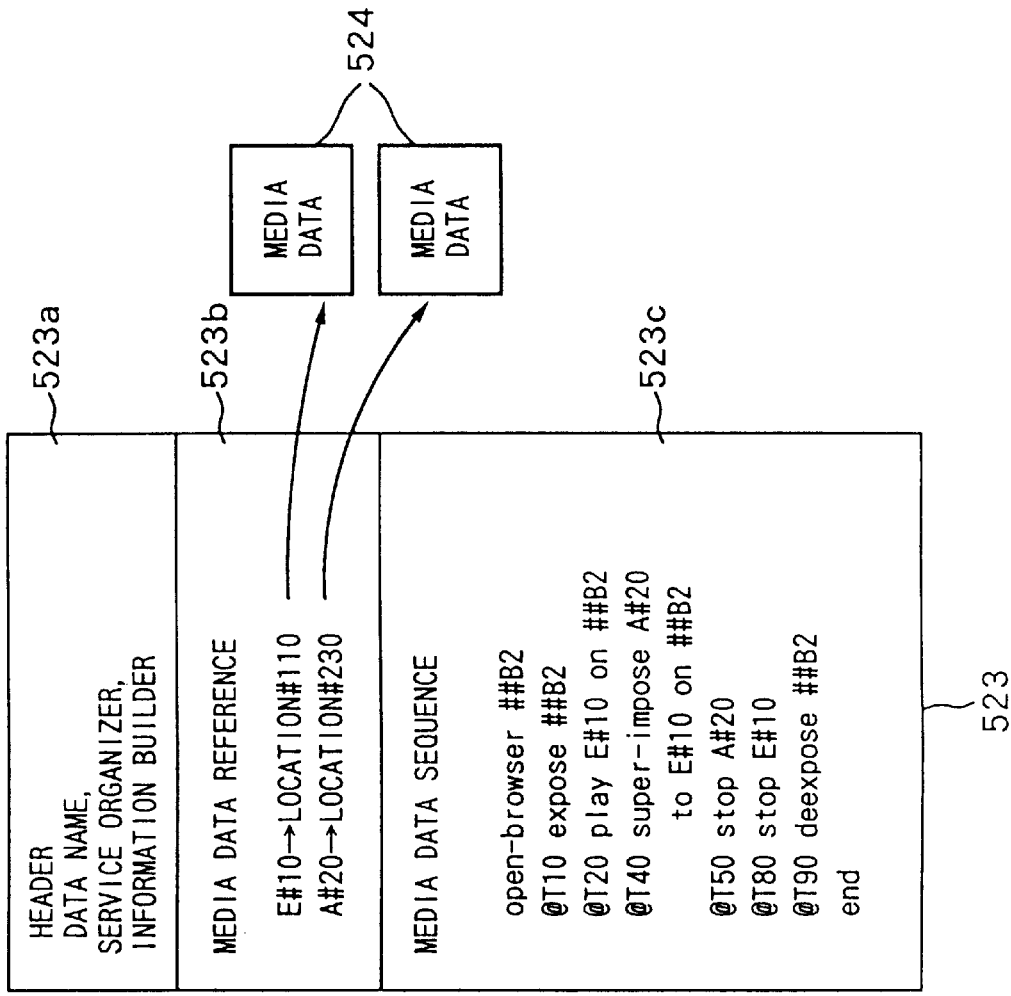
FIG. 4 is a view for explaining the content given by the sequence script shown in FIG. 3.

In the media sequence editor 516, based on the timing control by the timing simulator 518, script data from the script skeletons 513 and media data from the media data segments 514 are edited in the sequence generator 517 and the media processor 519, respectively so as to realize the media data sequence 523c shown in FIG. 4. By this, a sequence script 523 and media data 524 comprising a media data compound 522 are generated.

A sequence script 523 is comprised of a header 523a, a media data reference 523b, and a media data sequence 523c as shown in FIG. 4.

Here, in the media data reference 523b, the location information of the media data described in the media data sequence 523c is described.

Figure 9:
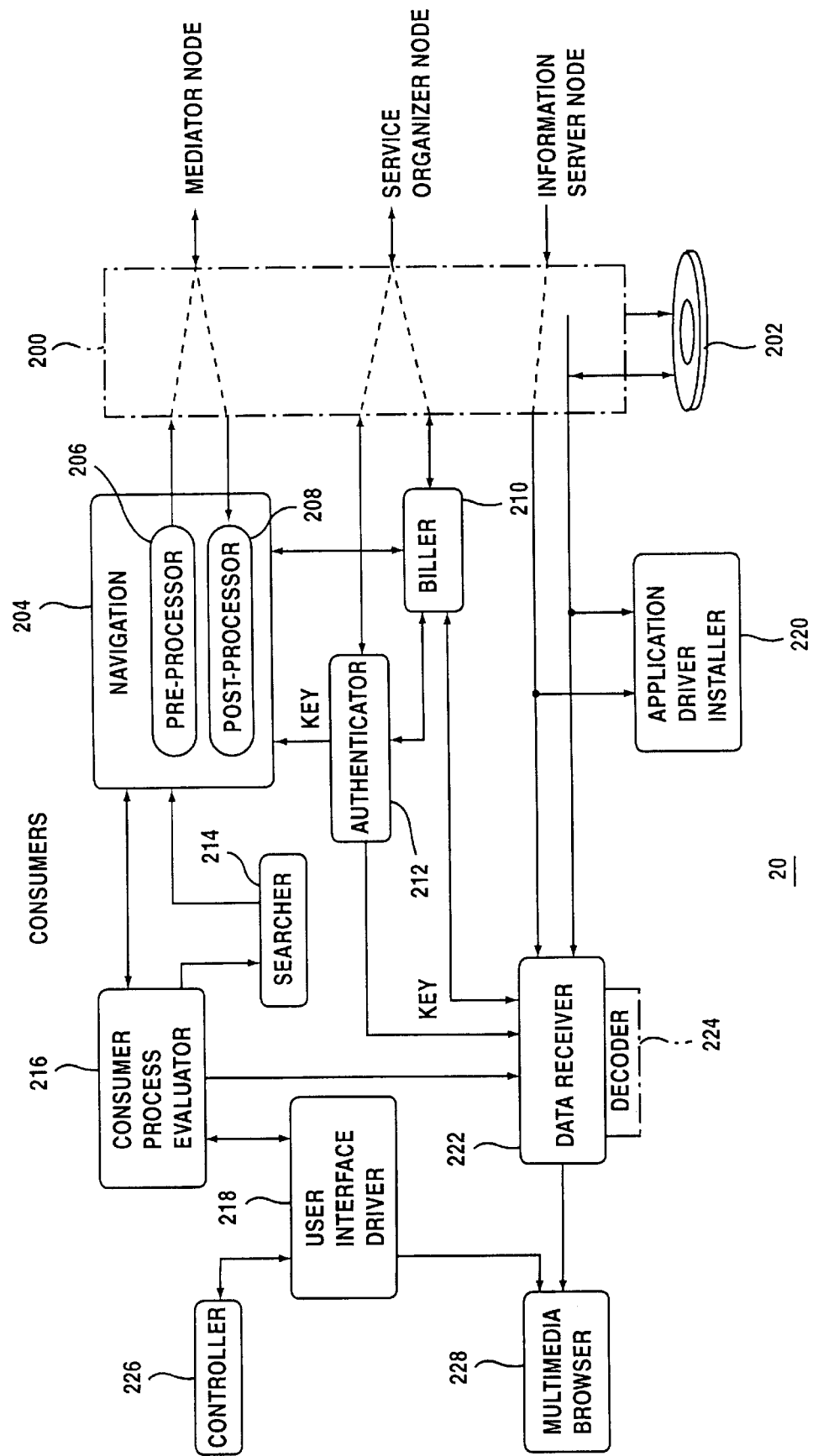
FIG. 9 is a view of the configuration of a consumer node shown in FIG. 1.

The sequence script 523 is finally processed in the multimedia browser 228 by an instruction of the consumer process evaluator 216 of the consumer node 20 shown in FIG. 9.

The information manager 510 can for example exchange information with another information builder nodes 14 connected to the network.

Note that, data given to a consumer node 20 by so-called package media is consumed by the consumer of the consumer node 20 through the local information server on the same node as the consumer node 20, for example, a digital video disk device (DVD device). That is, in the multimedia network system 1, even in a case where package media is locally handled by the consumer node 20, it is possible to provide data via the local server 38.

Figure 5:
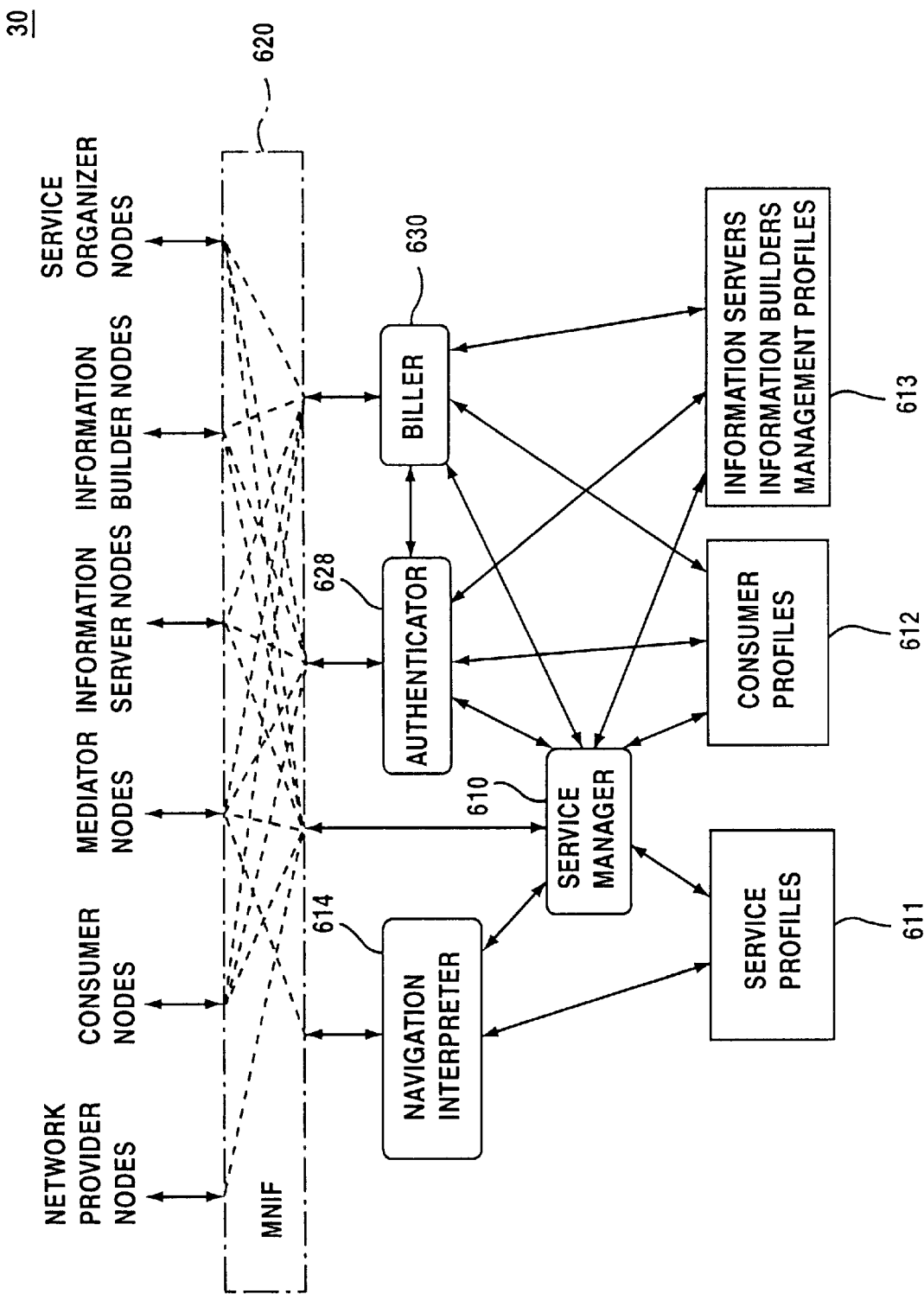
FIG. 5 is a view of the configuration of a service organizer node shown in FIG. 1.

FIG. 5 is a view of the configuration of a service organizer node 30.

As shown in FIG. 5, the service organizer node 30 has a service manager 610, a service profiles 611, consumer profiles 612, information servers and information builders management profiles 613, a navigation interpreter 614, a multiple network interface 620, an authenticator 628, and a biller 630.

The service profiles 611 contains information on the contents of the services which it itself provides.

The consumer profiles 612 provides customer (subscriber) information and information on the contents of services provided to the customers, the state of payment, the frequency of utilization, etc.

The information servers and information builders management profiles 613 provides the information concerning the locations of the used information server nodes 32 and the information builder nodes 14, the contents of services, etc.

The service organizer nodes 30 provides to consumer nodes 20 for example a shopping service via the communication network 2 or a service such as a provision of banking via the communication network 2. That is, it is provided with a program module for realizing the functions of the service, provides the service to consumer nodes 20 in accordance with the request information, and, further, realizes the additional functions relating to the provision of the service, for example, management of the service, maintenance, customer management, and billing. Note that the program module is provided preferably through an information server node. Note that the service organizer node 30 can also be a service organizing unit (information processing unit) in which a plurality of devices work together to provide a single service similar to the information server nodes 32.

Note that it is also possible to connect pairs of service organizer node 30 and an information server node 32 in a hierarchical form to realize a consigned server, or adopt a so-called hierarchy of recursive structure configuration in which a plurality of information server nodes 32 cooperate and call each other.

Note that, in addition to the above-mentioned program module for realizing service functions, the data indicating the acceptance of the receipt of the provision of the service, data used for providing instructions on the use of the service, interactive data relating to the provision of the service, etc. are transmitted from the service organizer node 30 to the consumer nodes 20 via the communication network 2.

Further, mediate data indicating the contents of the service provided by the service organizer node 30 is transmitted from the service organizer node 30 to the mediator node 12 via the communication network 2. Further, the request data (request information) for making a mediator node 12 act as a relay unit and designating the service requested by a consumer of a consumer node 20 to the service organizer node 30 is transmitted from the consumer node 20 to the mediator node 12 and then transmitted to the service organizer node 30.

In such a case, when the service organizer function is provided by an information processing unit constituted by a plurality of service organizer nodes, for realizing the provision of the program module for realizing the service, management of the service, maintenance, customer management, billing processing, etc., similar to the case where the information server node 32 is the information processing unit, the data for achieving a cooperative and coordinated operation among the devices is further transmitted with the mediator node 12.

FIG. 6 is a view of the case of consigning a function to another information server node $32_2$ when the information server node $32_1$ approaches the limit of its capacity.

Figure 7:
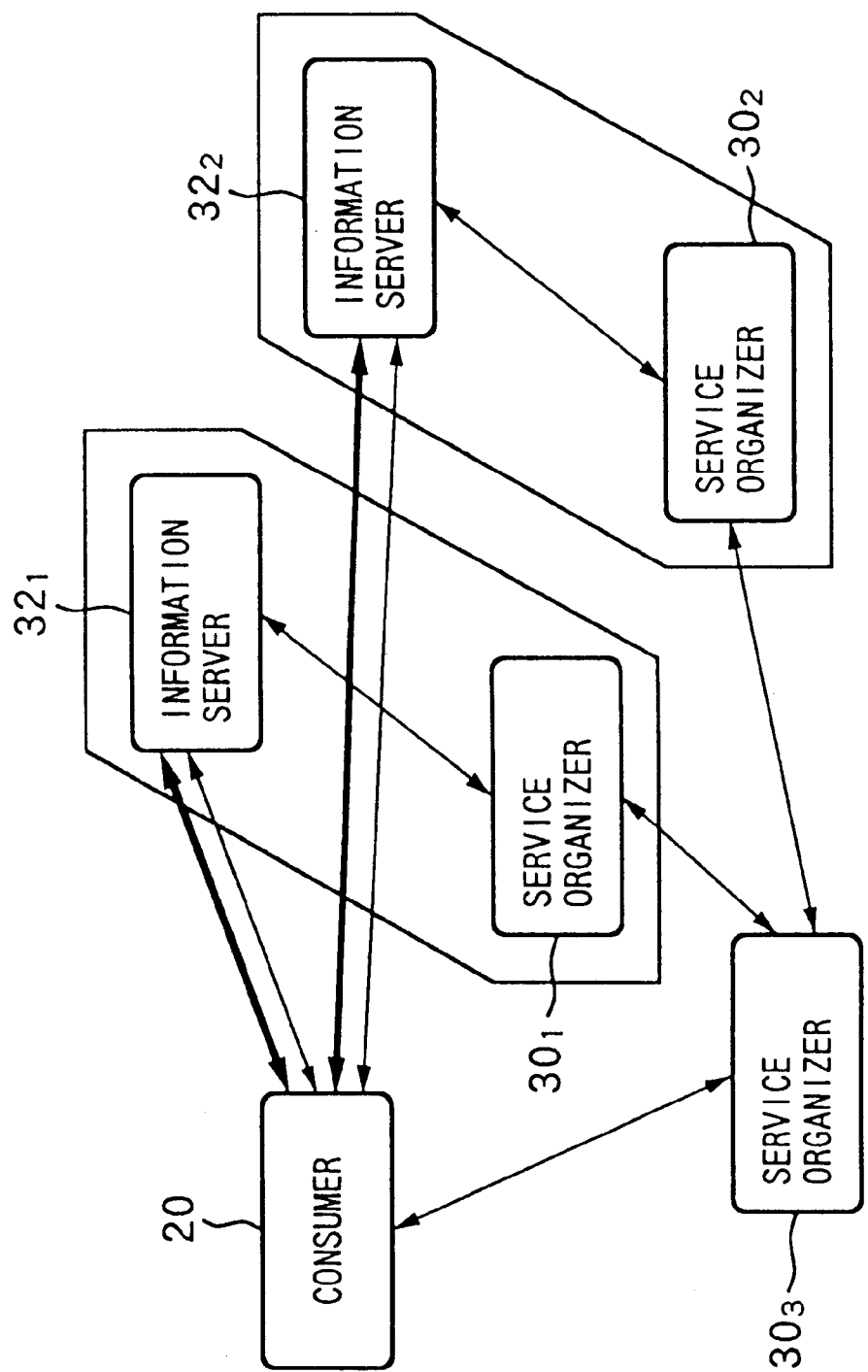
FIG. 7 is a view of a case where a plurality of services are utilized integratedly and, at the time of actual use, not the service organizer node ($30_3$), but a consignment configuration of the service organizer nodes ($30_1$ and $30_2$) is adopted.

FIG. 7 is a view of a case where a plurality of services are utilized integratedly and, at the time of actual use, not only the service organizer node $30_3$, but a consignment configuration of the service organizer nodes $30_1$ and $30_2$ is adopted.

Figure 8:
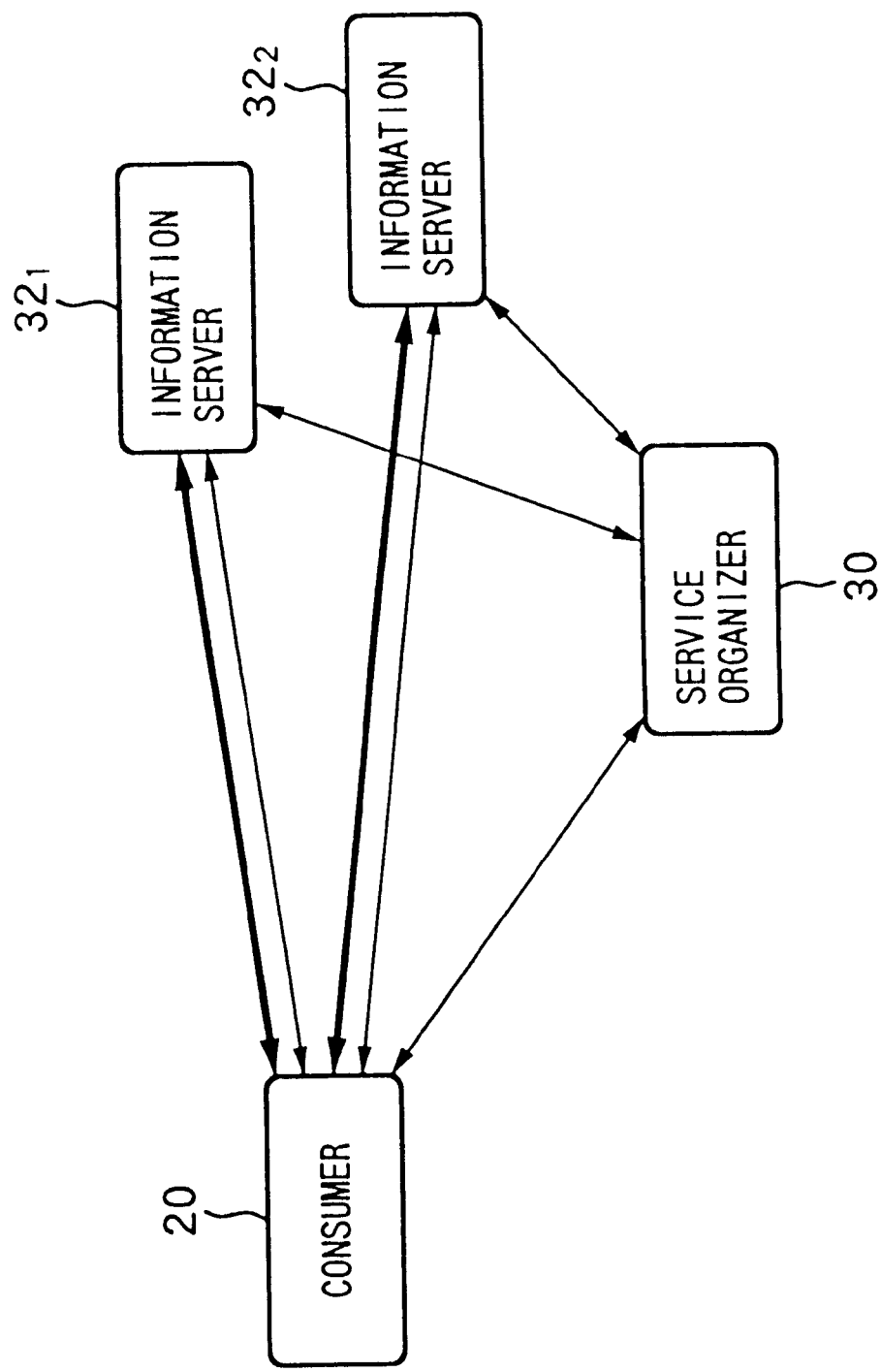
FIG. 8 is a view of a case where a plurality of information server nodes are controlled by a single service organizer.

FIG. 8 is a view of the case where a plurality of information server nodes $32_1$ and $32_2$ are controlled by a single service organizer node 30.

As shown in FIG. 6 and FIG. 7, the plurality of service organizer nodes 30 and information servers 32 can consign functions between each other or adopt an integrated configuration.

Further, as shown in FIG. 8, it is also possible for a plurality of information server nodes $32_1$ and $32_2$ to work together for providing a service to a single consumer node 20.

FIG. 9 is a view of the configuration of a consumer node 20 shown in FIG. 1.

As shown in FIG. 9, the consumer node 20 is for example a so-called multimedia computer which is comprised of hardware such as a multiple network interface 200, a decoder device 224, a controller 226, a multimedia browser 228, and a recording device 202 and software such as a navigation processor 204, a biller 210, an authenticator 212, a searcher 214, a consumer process evaluator 216, a user interface driver 218, an application driver installer 220, and a stream data receiver 222.

The authenticator 212 works together with the authenticator 628 of a service organizer node 30 shown in FIG. 5 to perform the procedure for user authentication at the time of starting use of a service. Further, the authenticator 212 works together with the authenticator 328 of a information server node 32 shown in FIG. 2 to perform the procedure for user authentication at the time of starting use of the data of the service. Further, the authenticator 212 works together with the authenticator 728 of a mediator node 12 shown in FIG. 10 to perform the procedure for user authentication according to need at the time when mediation on the information is requested.

The biller 210 works together with the biller 630 of a service organizer node 30 shown in FIG. 5 to perform the procedure for billing if the system is a subscription system. Further, the biller 210 works together with the biller 330 of a information server node 32 shown in FIG. 2 to perform the procedure for billing if the system is a usage-based system. Further, the biller 210 works together with the biller 730 of a mediator node 12 shown in FIG. 10 to perform the procedure for billing if a fee is charged for the mediation.

Further, the pre-processor 206 of the navigation processor 204 prepares request data for making inquiries to mediator nodes 12. Further, the post-processor 208 interprets, arranges, and processes (uses) the information from the mediator node 12 in accordance with the request data.

The consumer process evaluator 216 controls the processing of data in the consumer node 20.

The consumer node 20 displays the data stream provided from information server nodes 32 to the consumer node or executes the program module for realizing the service provided by the service organizer nodes 30, controls and manages the execution, etc.

Note that, a real time data stream or program module and the data according to them are transmitted between the consumer nodes 20, the service organizer nodes 30, and the information server nodes 32, as already mentioned in the explanation of the service organizer node 30 and the information server node 32.

Further, where the data stream and data for inquiring about a service which can be provided from the service organizer nodes 30 and the information server nodes 32 etc. are transmitted from a consumer node 20 to a mediator node 12 via the communication network 2 and further information server nodes 32 and service organizer nodes 30 are constituted so as to receive the data relating to the provision of the data and service via the mediator node 12, as already mentioned in the explanation of the service organizer node 30 and the information server node 32, the data stream to be provided and the data for designating the service are transmitted via the communication network 2.

Further, where mediate information in response to an inquiry from a consumer node 20 is transmitted from a mediator node 12 to the consumer node 20 via the communication network 2 and further the mediator node 12 performs the service in place of a service organizer node 30, the data relating to the service performed by the mediator node 12 is transmitted via the communication network 2.

Figure 10:
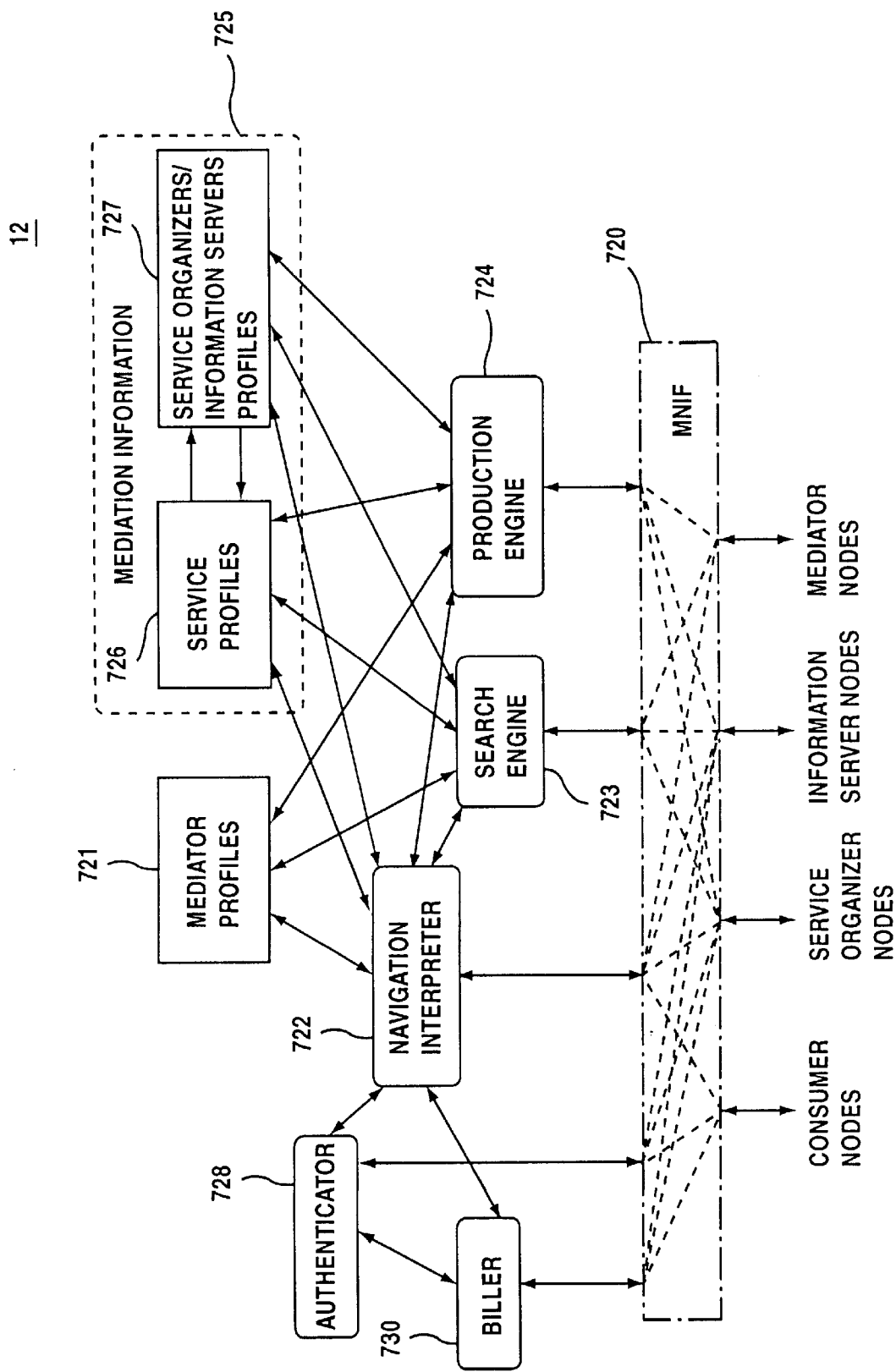
FIG. 10 is a view of the configuration of a mediator node shown in FIG. 1.

FIG. 10 is a view of the configuration of a mediator node 12.

As shown in FIG. 10, the mediator node 12 has a multiple network interface 720, mediator profiles 721, a navigation interpreter 722, a search engine 723, a production engine 724, a mediation information unit 725, an authenticator 728, and a biller 730.

The mediator profiles 721 provide information concerning the neighboring mediator nodes 12.

The navigation interpreter 722 interprets the request data input via the multiple network interface 720 and outputs request data to the outside via the multiple network interface 720.

Figure 11:
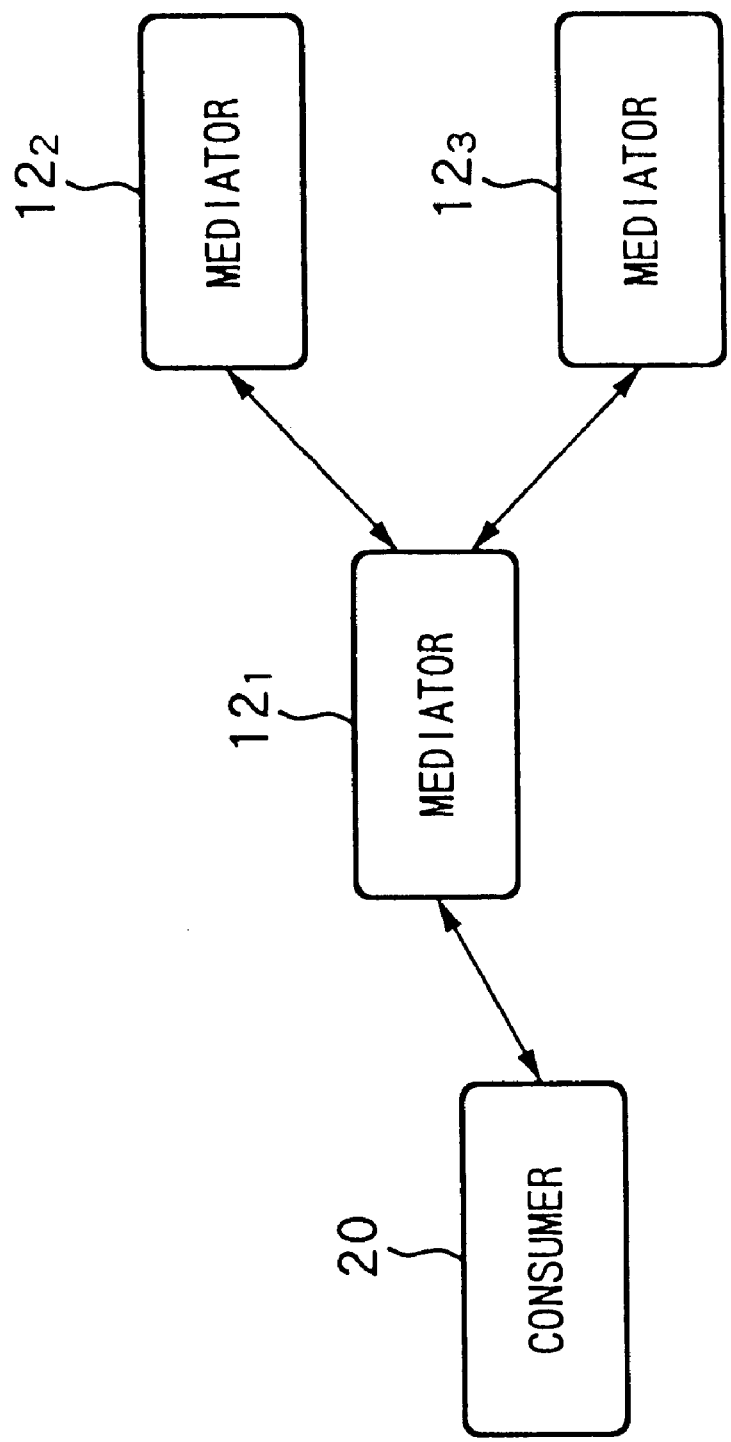
FIG. 11 is a view of the case where a plurality of mediator nodes cooperate.

The search engine 723 outputs the request data to the service organizer nodes 30 and the information server nodes 32. Further, in the case as shown in FIG. 11, the search engine 723 and the production engine 724 refer to the mediator profile 721 and, while working together, communicate with another mediator node 12. The production engine 724 inputs the mediate information from the service organizer nodes 30 and the information server nodes 32.

The mediation information unit 725 is provided with service profiles 726 and service organizers/information servers profiles 727. The service profiles 726 relate to the first type of mediate information concerning the service and data provided by the service organizer nodes 30 and the information server node 32, while the service organizers/information servers profiles 727 relate to the second type of mediate information indicating the locations of the service organizer nodes 30 and the information server nodes 32. Note that the service profiles 726 and the service organizers/information servers profiles 727 refer to each other for information.

The mediator node 12 receives the mediate information from the service organizer nodes 30 and the information server nodes 32 via the communication network 2 and transmits the locations of the service organizer nodes 30 and the information server nodes 32 generated based on the information of the communication network 2 etc. received from the network provider nodes 16 or the secondary mediate information generated by processing the mediate information from the service organizer nodes 30 and the information server nodes 32 or the like to the consumer nodes 20 in response to a request. Further, the mediator node 12 provides a service of a service organizer node 30 according to need, and further service organizer nodes 30, and the information server nodes 32 are information processing units constituted by a plurality of nodes of those and when the service organizer nodes 30 and the information server nodes 32 operate cooperatively and coordinately, the operations are coordinated among the nodes inside each information processing unit, among the nodes among a plurality of information processing units, and between the service organizer nodes 30 and the information server nodes 32.

Note that, as already mentioned in the explanation of the consumer node 20, the mediate information in response to a request of a consumer node 20 and further the data indicating the locations etc. of the consumer node 20 and the information server nodes 32 are transmitted from the mediator node 12 to the consumer node 20 via the communication network 2 and, when the mediator node 12 performs a service in place of a service organizer node 30, the data relating to the service to be provided is transmitted between the mediator node 12 and the consumer node 20 via the communication network 2.

Further, when, as already mentioned in the explanation of the service organizer node 30 and the information server node 32, the mediate information is transmitted from the service organizer nodes 30 and the information server nodes 32 to the consumer nodes 20 via the communication network 2 and a service organizer 30 is an information processing unit, the data for the cooperative and coordinated operations of the nodes constituting the information processing unit is transmitted between the mediator node 12 and the information processing unit etc. via the communication network 2.

Further, where a plurality of mediator nodes 12 are connected to the communication network 2, the data for consigning the transmission of mediate information to a consumer node 20 is transmitted among the plurality of mediator nodes 12 via the communication network 2.

FIG. 11 is a view of a case where a plurality of mediators $12_1$ to $12_3$ operate cooperatively.

Note that, as shown in FIG. 11, the plurality of mediator nodes 12 can operate cooperatively. In this case, the data used for a search and browsing is transmitted among the mediator nodes 12.

Below, the operation of the multimedia network system 1 (FIG. 1) will be explained.

First, an explanation will be made of the operation of the multimedia network system 1 where a consumer node 20 is provided with a service from a service organizer node 30.

When the service organizer node 30 starts providing the service, mediate information indicating the contents of the service which is starting to be provided is transmitted to a mediator node 12 via the communication network 2. The mediator node 12 stores the mediate information transmitted from the service organizer node 30.

The consumer of the consumer node 20 inputs the operation data from the controller 226 (FIG. 9) of the consumer node 20 to transmit data requesting the mediate information indicating the contents of the service provided by the service organizer node 30 from the consumer node 20 to the mediator node 12 via the communication network 2.

The mediator node 12, when receiving data from the consumer node 20, transmits the mediate information to the consumer node 20 in accordance with the received data.

The consumer node 20 receiving the mediate information from the mediator node 12 outputs the mediate information to the multimedia browser 228 to display it to the consumer.

The consumer viewing the mediate information inputs the data for designating the service to be received via the controller 226. The consumer node 20 transmits the input data to the service organizer node 30 via the communication network 2.

The service organizer node 30 receiving the data from the consumer node 20 transmits the program module for realizing the service to the consumer node 20 via the communication network 2, makes the consumer node 20 execute this, or interactively transmits the data with the consumer node 20 via the communication network 2 to provide the requested service.

Next, an explanation will be made of the operation of the multimedia network system 1 when a consumer node 20 receives a data stream from a information server node 32.

When the information server node 32 starts to provide the data stream, mediate information indicating the contents of the data stream which has started to be provided in transmitted to a mediator node 12 via the communication network 2. The mediator node 12 stores the mediate information transmitted from the information server node 32, The consumer of the consumer node 20 inputs operation data from the controller 226 of the consumer node 20 to transmit data for requesting the mediate information indicating the contents of the data stream provided by the information server node 32 from the consumer node 20 to the mediator node 12 via the communication network 2.

When receiving the data from the consumer node 20, the mediator node 12 transmits the mediate information to the consumer node 20 in response to the received data.

The consumer node 20 receiving the mediate information from the mediator node 12 outputs the mediate information to the multimedia browser 228 to display it to the consumer.

The consumer viewing the mediate information inputs the data for designating the data stream to be in received via the controller 226. The consumer node 20 transmits the input data to the information server node 32 via the communication network 2.

The information server node 32 receiving the data from the consumer node 20 transmits the requested data stream to the consumer node 20 via the communication network 2 or further transmits the data necessary for the provision of the data stream with the consumer node 20.

In the above explanation, though operations for utilizing the above-mentioned data and services are handled by the consumer of the consumer nodes, the operations may of course be automatically manipulated in the consumer node.

Below, the configuration of the node shown in FIG. 1 will be explained.

Figure 12:
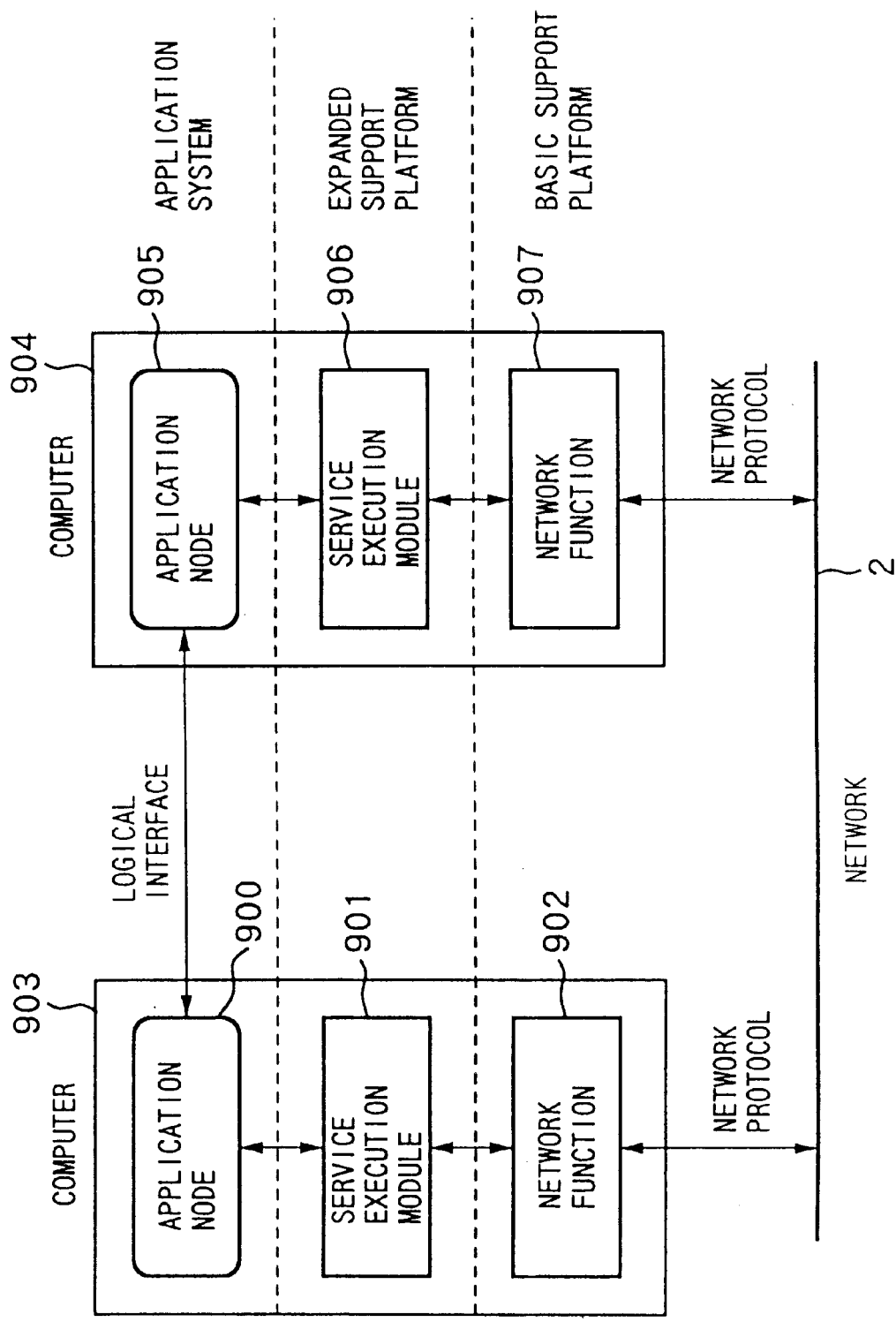
FIG. 12 is a view for explaining the configuration for realization of nodes (application nodes) shown in FIG. 1 and the configuration of communication among nodes.

FIG. 12 is a view for explaining the configuration for realizing the nodes (application nodes) shown in FIG. 1 and the communication configuration among the nodes.

As shown in FIG. 12, each application node 900 is realized in a computer 903 by using a network function 902 and a service execution module 901. Further, the application 900 and the application 905 of the computer 904 are substantially connected by a logical interface, while the network function 902 and the network function 907 are connected via the communication network 2 (network).

The service execution modules 901 and 906 use functions provided as system functions in the expanded platforms such as a billing function, a navigation function for searches, and a multimedia database function for efficient handling of the multimedia data.

Here, the navigation function is a function for searching for and presenting related multimedia information connected by links through the links.

The service execution modules 901 and 906 are respectively provided with predetermined functions necessary for realizing the application nodes 900 and 905.

Further, the network functions 902 and 907 are provided with the requirements in accordance with the application nodes 900 and 905, respectively.

Figure 13:
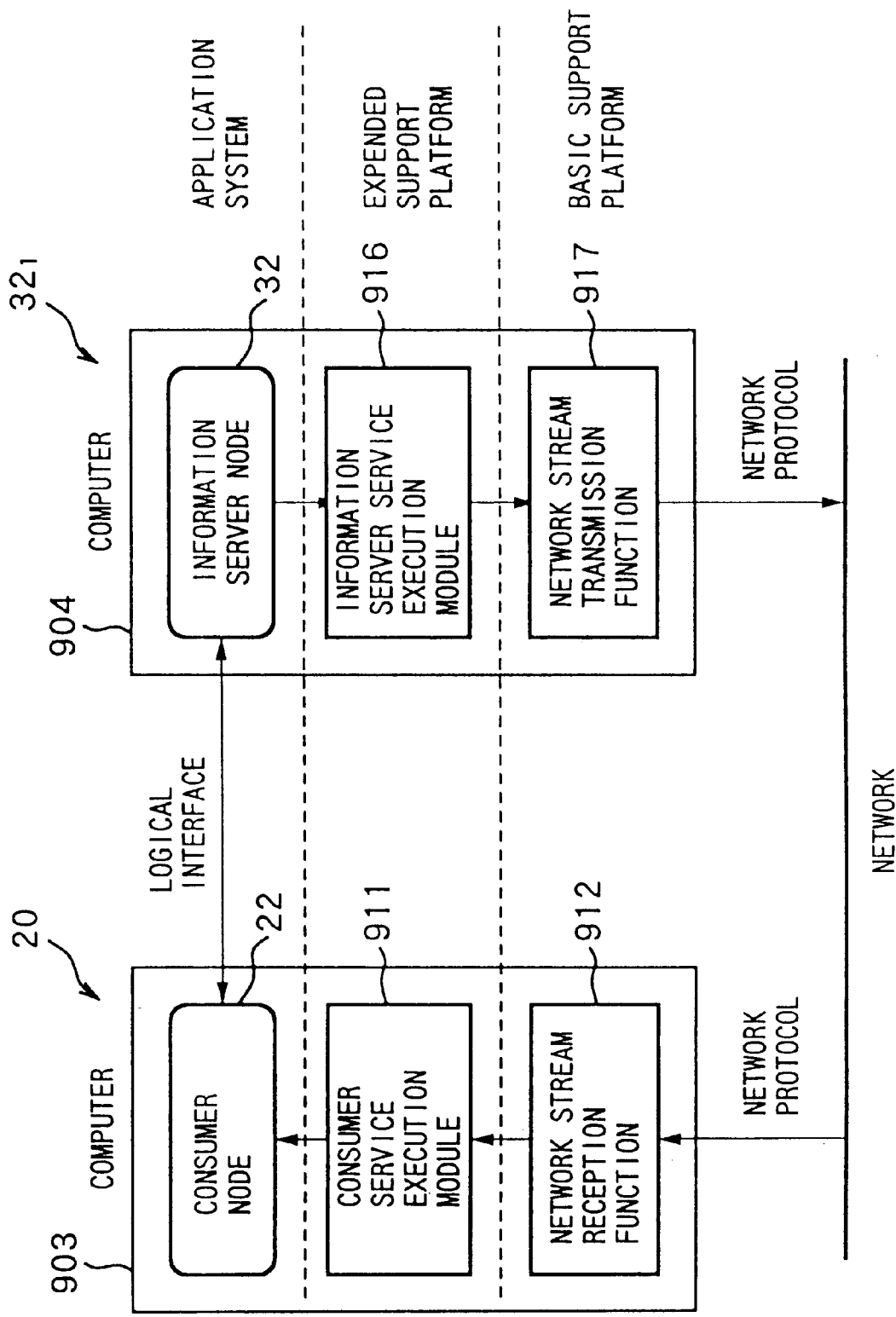
FIG. 13 is a view of the configuration for realization of nodes in the case where one of the nodes shown in FIG. 12 is a consumer node and the other is an information server node.

More specifically, the consumer node 20 and the information server node 32 shown in FIG. 1 are realized as shown in FIG. 13 by using the application nodes 900 and 905 shown in FIG. 12 as the consumer node 20 and the information server node 32, respectively.

In this case, as the service execution modules 901 and 906 shown in FIG. 12, adaptation is made of a consumer service execution module 911 and an information server service execution module 916 provided with predetermined functions required for realizing the consumer node 20 and the information server node 32, respectively.

Further, as the network functions 902 and 907 shown in FIG. 12, a network stream receiving function 912 and a network stream transmission function 917 are respectively used.

Figure 14:
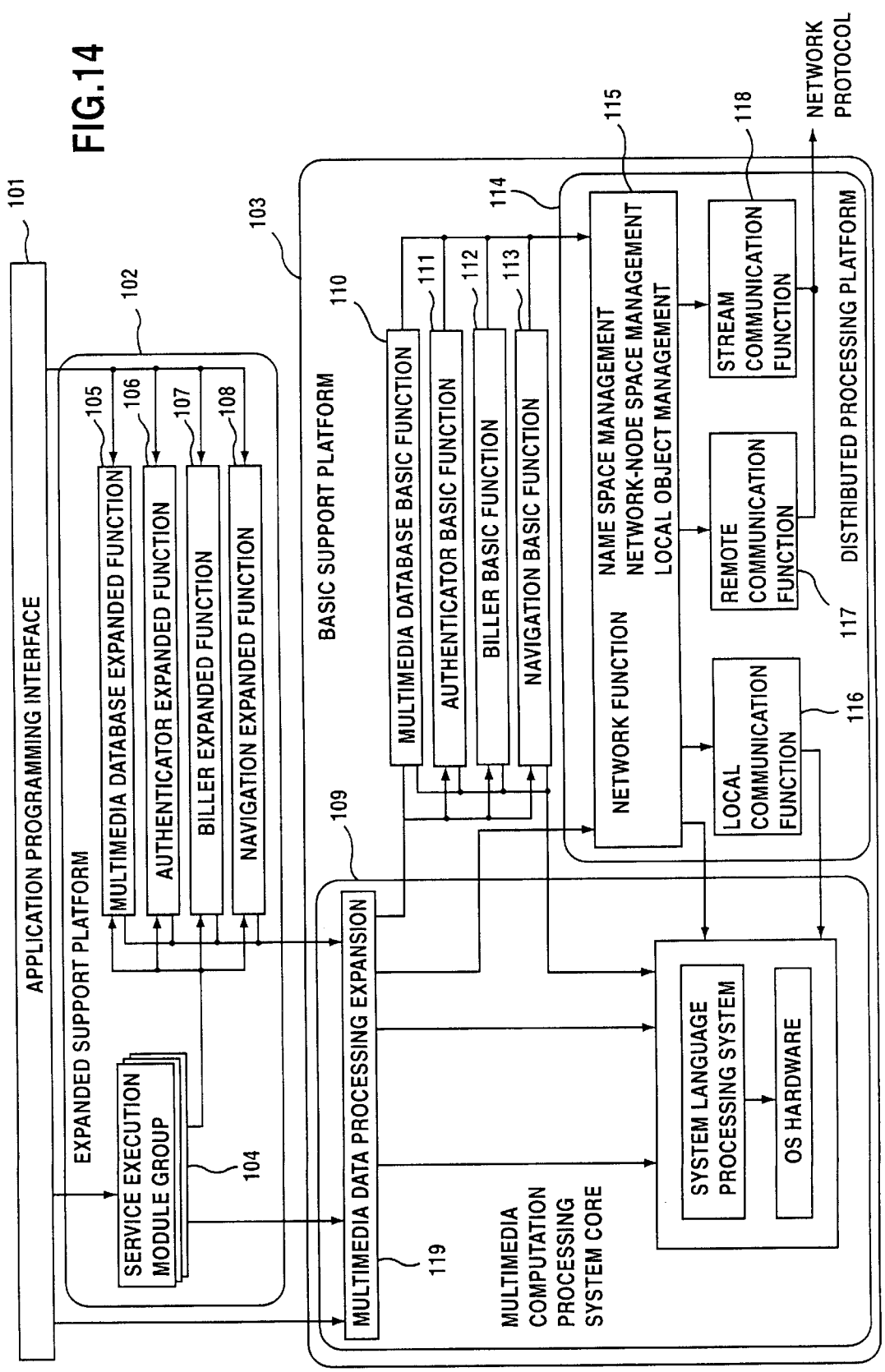
FIG. 14 is a view of a more detailed configuration of a node constituting the data processor shown in FIG. 1.

A more detailed example of the system configuration of the computers shown in FIG. 12 and FIG. 13 will be shown in FIG. 14.

As shown in FIG. 14, each node is constituted by an application programming interface 101, an expanded support platform 102, and a basic support platform 103.

The application programming interface 101 is provided with a service execution module group 104, a multimedia database expanded function module 105, an authenticator expanded function module 106, a biller expanded function module 107, and a navigation processor expanded function module 108.

The service execution module group 104 provides various services by using the functions of the basic support platform 103 as a base.

The multimedia database expanded function module 105, the authenticator expanded function module 106, the biller expanded function module 107, and the navigation processor expanded function module 108 provide functions obtained by expanding the functions of the multimedia database basic function module 110, authenticator basic function module 111, biller basic function module 112, and navigation processor basic function module 113, respectively, using their functions as a base, Further, the basic support platform 103 is provided with a multimedia computation processing core 109, the multimedia database basic function module 110, authenticator basic function module 111, biller basic function module 112, navigation processor basic function module 113, and a distributed processing platform 114.

The multimedia calculation processing core 109 is provided with a multimedia data processing expansion unit 119.

The multimedia data processing expansion unit 119 is provided with a function of integratedly controlling various functions provided in the basic support platform 103, a programming interface function, and continuous media processing (stream data processing) functions such as the sending and interruption of a stream, fast forward, and rewind.

Further, the multimedia database basic function module 110 is comprised of for example a mono-media database management function, a multimedia management function, and an interactive function. The mono-media database management function provides the functions inherently necessary for managing the individual media. The multimedia management function performs for example integration of the mono-media and the coordination of mono-media databases dispersed in location. The interactive function is comprised by various user interface functions for supporting the multimedia presentation functions.

The authenticator basic function module 111 realizes the user authentication function by a password as mentioned before.

The biller basic function module 112 realizes the billing function as mentioned before.

Further, the distributed processing platform 114 is provided with a network function module 115, a local communication function module 116, a remote communication function module 117, and a stream communication function module 118.

Below, an explanation will be made of modifications of the configuration and operation of the multimedia network system 1.

That is, rather than a consumer node 20 transmitting the data for designating the service and data stream to be received directly to a service organizer node 30 and an information server node 32 via the communication network 2, it may transmit the data via a mediator node 12.

Figure 15:
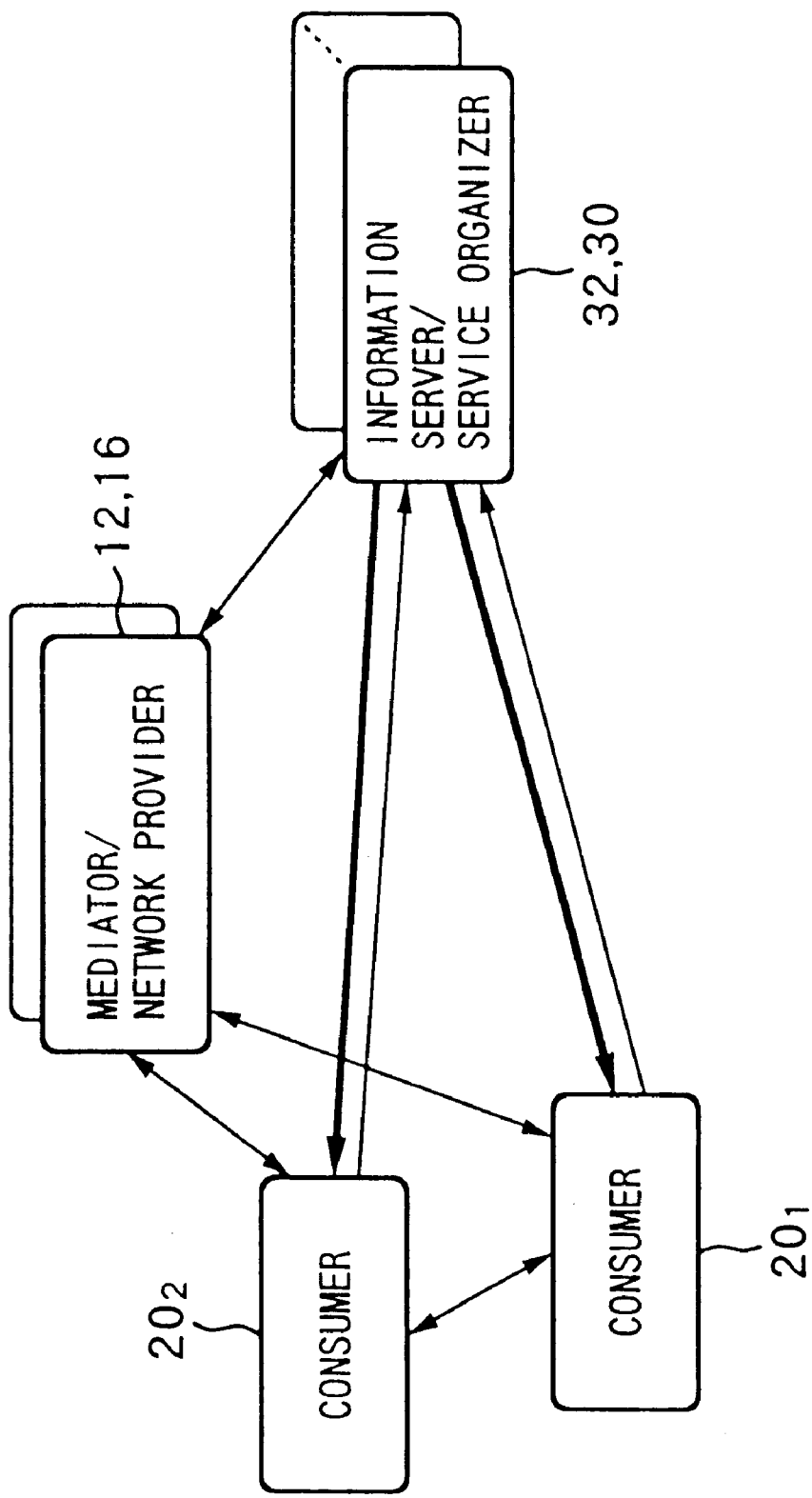
FIG. 15 is a view illustrating the flow of data among two consumer nodes (FIG. 1 and FIG. 9), a mediator node/ network provider node, and a service organizer node/ information server node.

Further, a plurality of consumer nodes 20 may be connected to the communication network 2. In such a case, for example, as shown in FIG. 15, two consumer nodes $20_1$ and $20_2$ may transmit the data with a mediator node 12, a service organizer node 30, and an information server node 32 via the communication network 2 so as to realize the provision of the service and the data stream between the consumer nodes 20 and the service organizer node 30 and the information server node 32 explained above.

Note that, concerning the same information provided from the service organizer node 30 and the information server node 32, the data for utilization while exchanging information between the consumer nodes $20_1$ and $20_2$, for example, data for joint searches and viewing of news, searches for reservation information, and joint shopping is transmitted between the consumer nodes $20_1$ and $20_2$.

Figure 16:
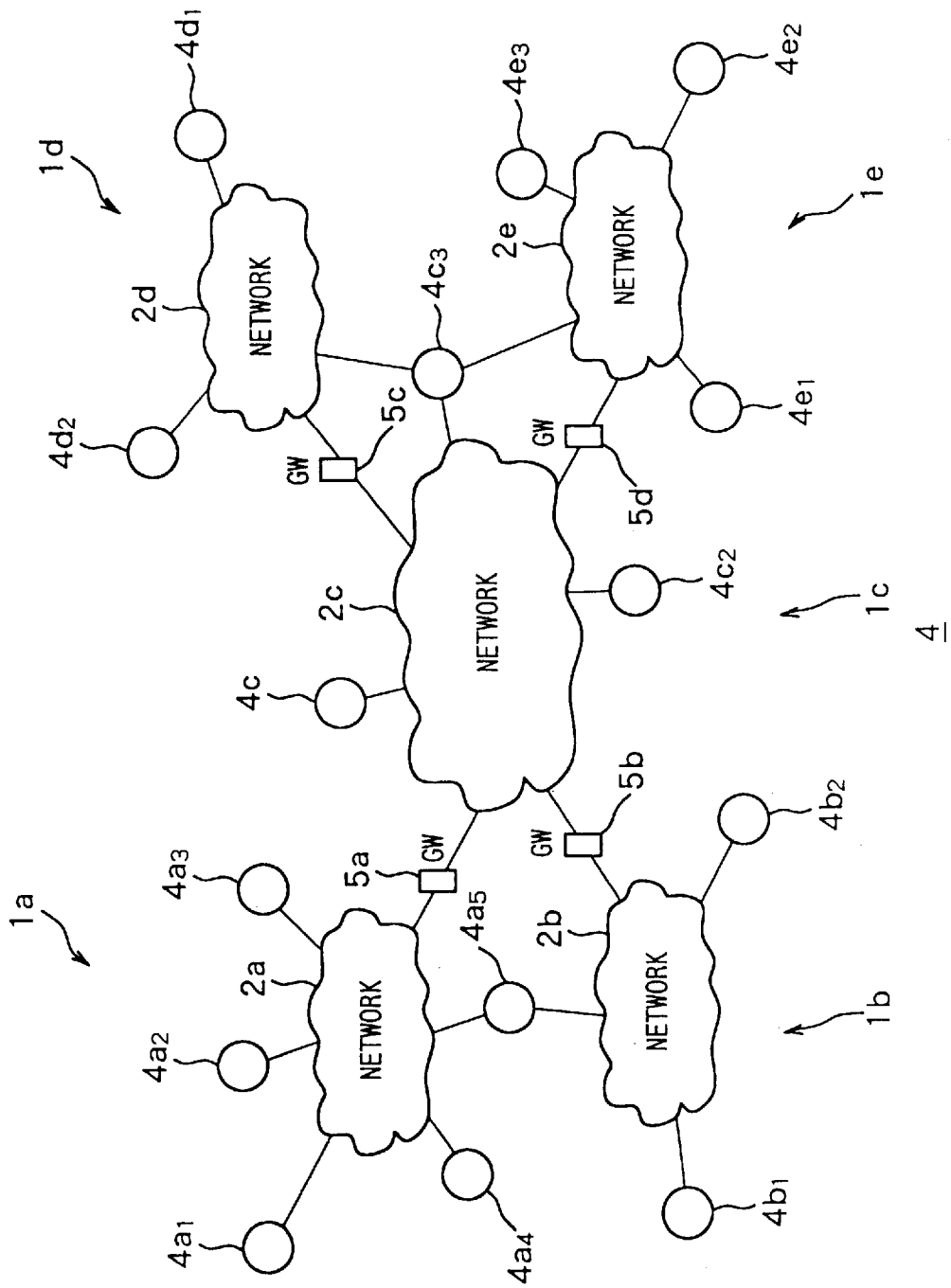
FIG. 16 is a view of an example of the configuration of a large scale multimedia network system comprising a plurality of multimedia network systems each of which having a plurality of nodes and different types of communication networks connected via gateway processors etc.

Further, as shown in FIG. 16, it is possible to connect a plurality of multimedia network systems 1a to 1e respectively having nodes $4a_1$ to $4a_5$, $4b_1$ to $4b_2$, $4c_1$ to $4c_3$, $4d_1$, $4d_2$, and $4e_1$ to $4e_3$ (mediator nodes 12, consumer nodes 20, service organizer nodes 30, and information server nodes 32) and different types of communication networks 2a to 2e via gateway processors (GW) 5a to 5d etc. so as to construct a large scale multimedia network system. In such a large scale multimedia network system, it is possible to transmit predetermined data among the nodes of the multimedia network systems 1a to 1e so as to realize the provision of services and data streams between the consumer nodes 20 and the service organizer nodes 30 and information server nodes 32 explained above.

Figure 17:
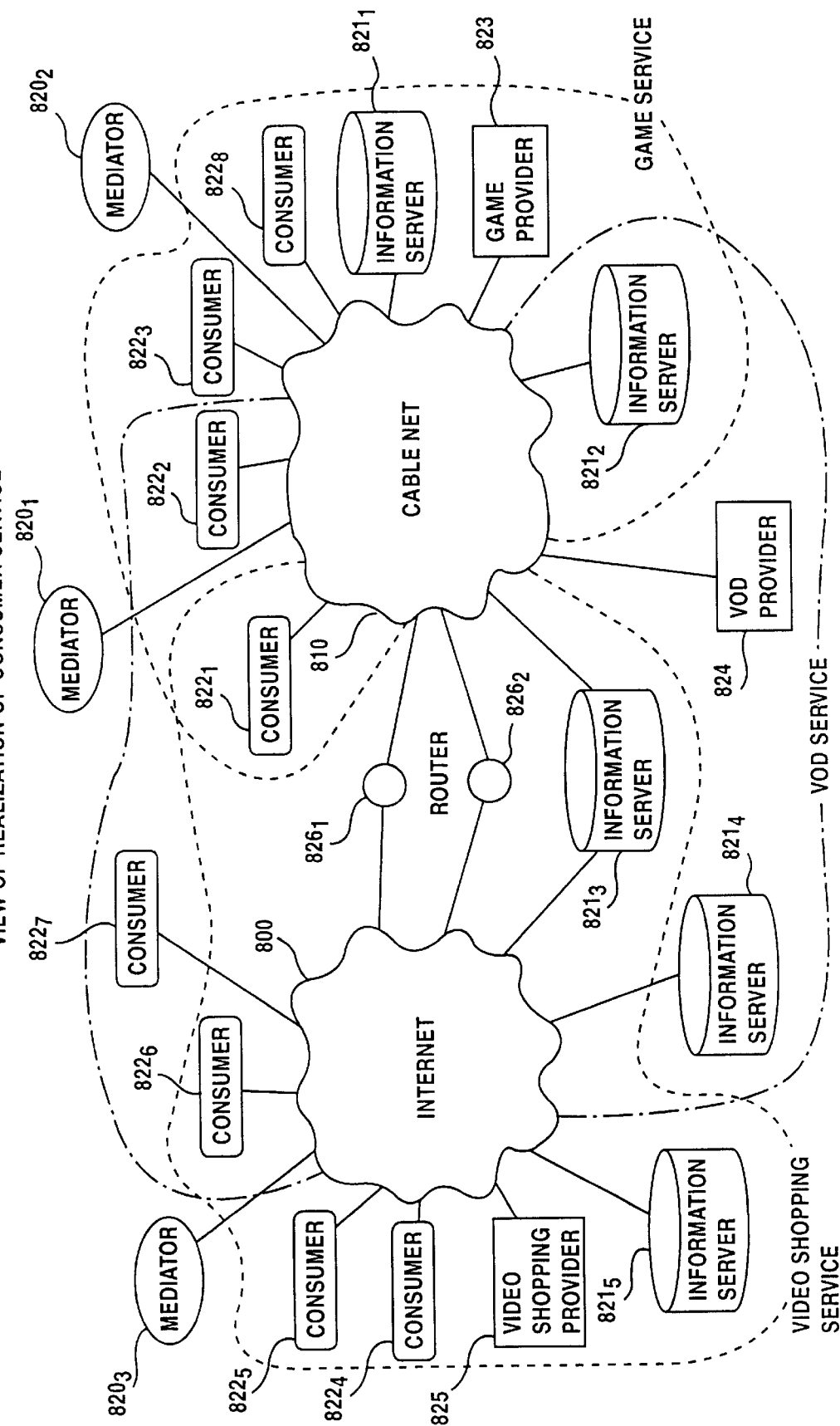
FIG. 17 is a view of a concrete example where a plurality of multimedia network systems are connected with each other.

A case where the plurality of multimedia network systems are connected to each other will be further explained by referring to FIG. 17.

FIG. 17 is a view of a concrete example of a case where a plurality of multimedia network systems are connected to each other.

As shown in FIG. 17, it in possible to connect the Internet 800 and cable net 810 to construct a large scale multimedia network system.

The Internet 800 has connected to it a mediator node $820_3$, information server nodes $821_3$, $821_4$, and $821_5$, consumer nodes $822_4$, $822_5$, $822_6$, and $822_7$, video shopping provider 825 that is a service organizer node, and routers $826_1$ and $826_2$. The cable net 810 has connected to it mediator node $820_1$ and $820_2$, information server nodes $821_1$, $821_2$, and $821_3$, consumer nodes $822_1$, $822_2$, $822_3$, and $822_8$, a game provider 823, a VOD provider 824 which are service organizer nodes, and routers $826_1$ and $826_2$.

Note that in the large scale multimedia network system shown in FIG. 16, the space management in the logical network is performed by the mediator nodes 12, but in the large scale multimedia network system shown in FIG. 17, the space management in the logical network is performed by the service organizer nodes.

Second Embodiment

Below, an explanation will be made of an application of the above embodiment.

Figure 18:
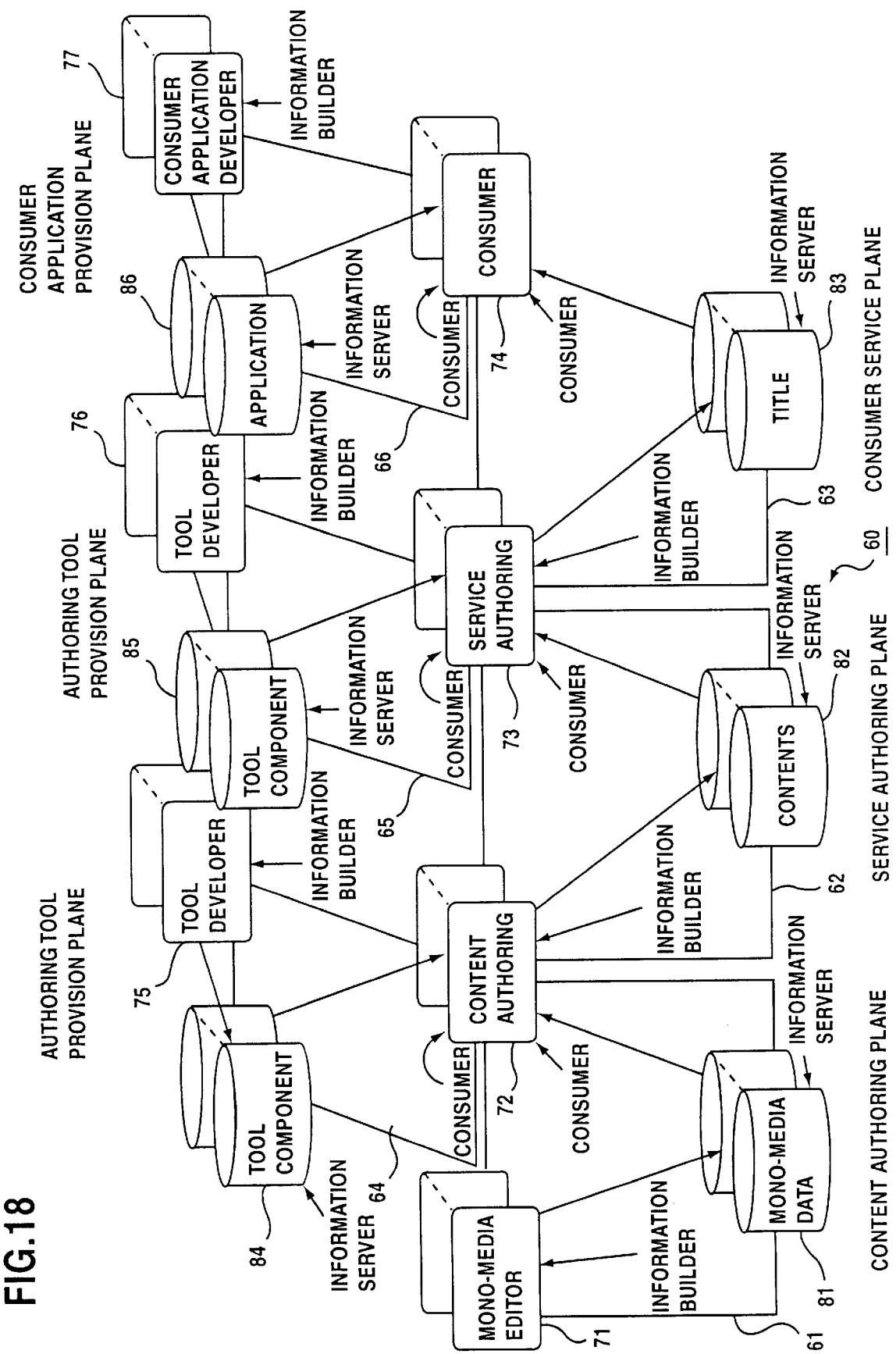
FIG. 18 is a view of an example of the configuration of the integrated multimedia information providing system of an application of the embodiment shown in FIG. 1.

FIG. 18 is a view of an example of the configuration of an integrated multimedia information service organizing system 60 of this application.

The integrated multimedia information service organizing system 60 is comprised of a plurality of multimedia information service planes as shown in FIG. 18, that is, a content authoring plane 61, a service authoring plane 62, a consumer service plane 63, two authoring tool provision planes 64 and 65, and a consumer application provision plane 66.

Figure 19:
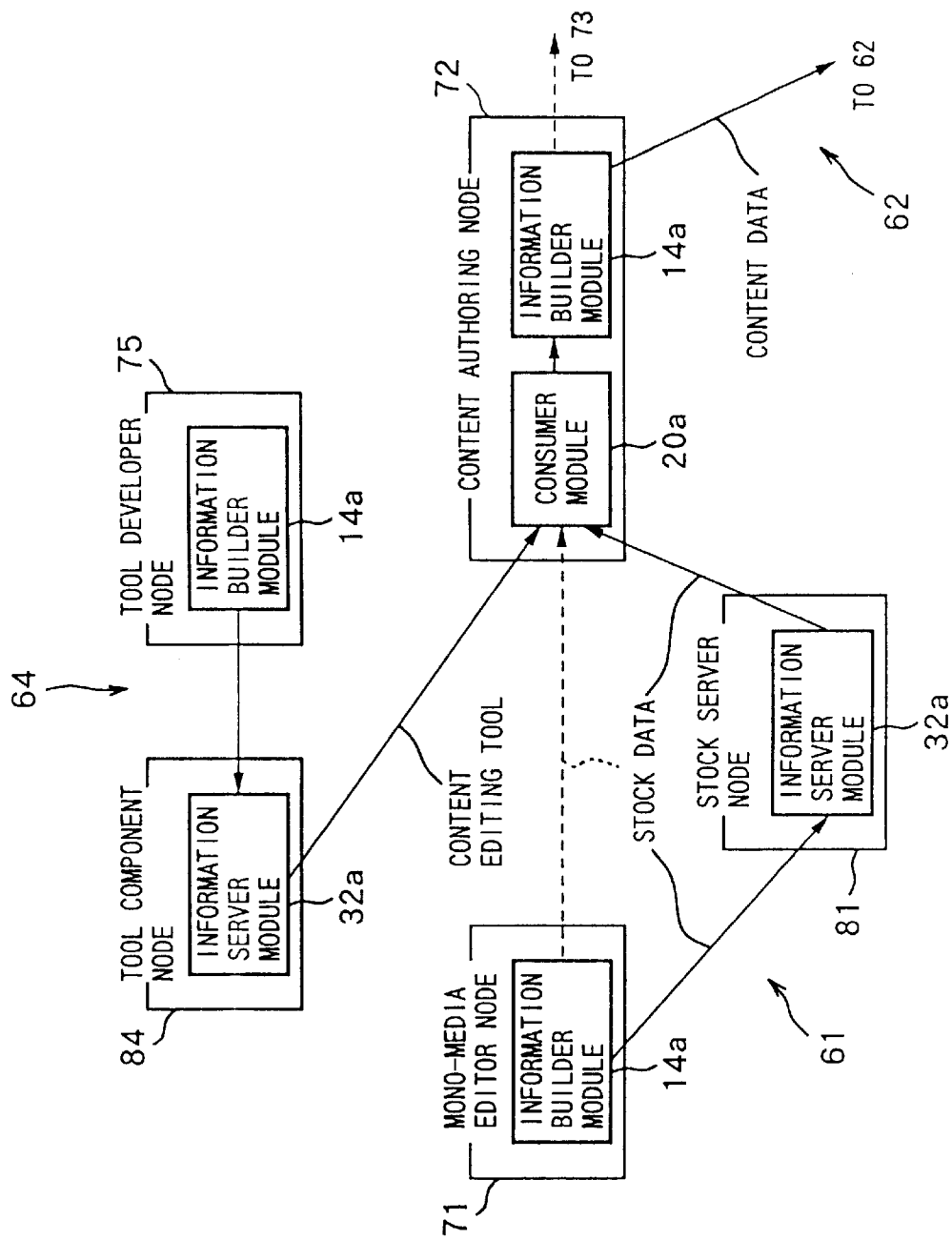
FIG. 19 is a view for explaining the modules comprising the nodes shown in FIG. 18.
Figure 20:
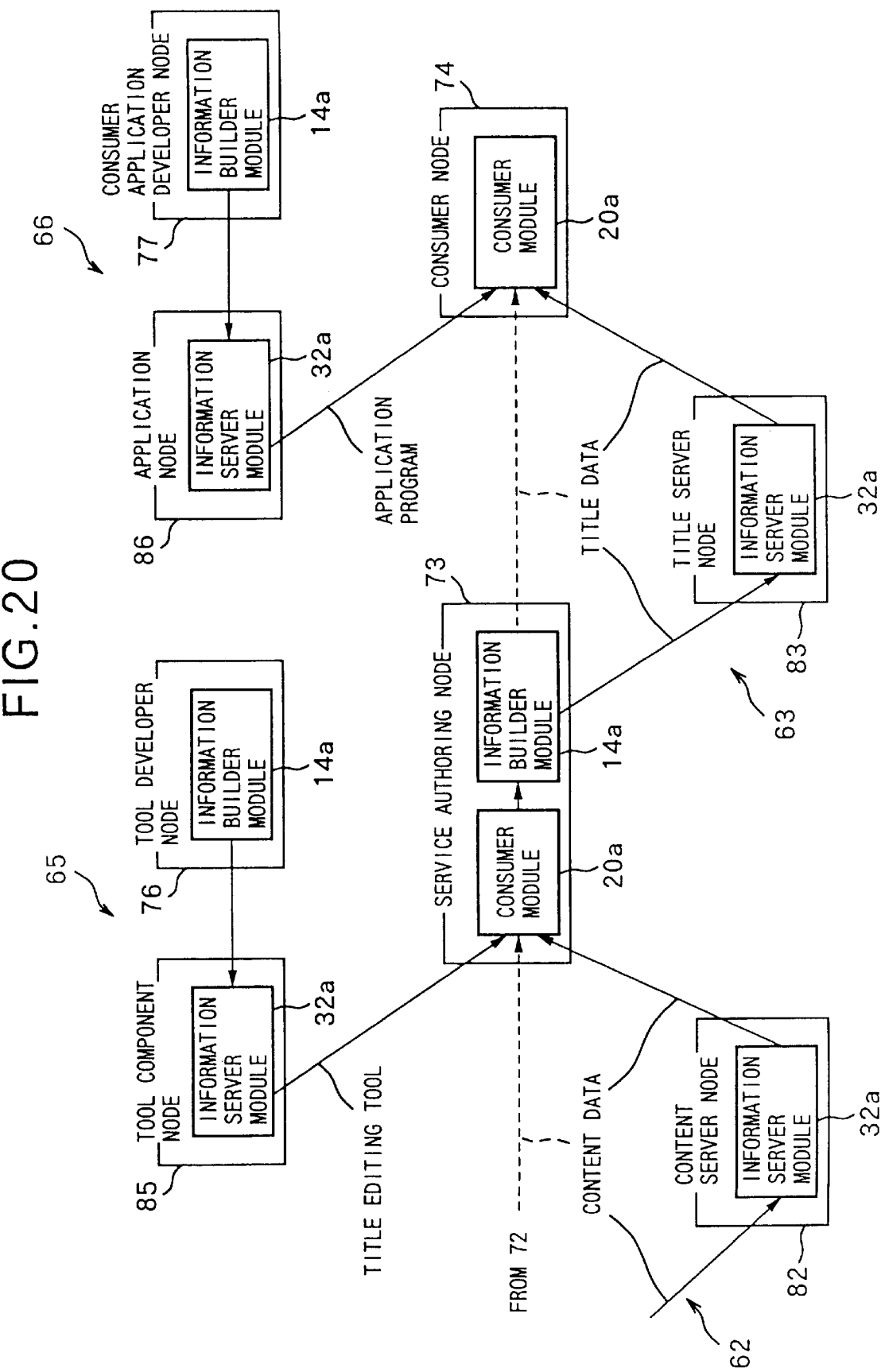
FIG. 20 is a view for explaining the modules comprising the nodes shown in FIG. 18.

The nodes comprising these planes, as shown in FIG. 19 and FIG. 20, are comprised by using the service execution modules shown in FIG. 12 which serve as bases for constructing the various nodes shown in FIG. 1.

Note that, in the present example, a case where the nodes are constituted using the service execution modules of the consumer nodes 20, the information server nodes 32, and the information builder nodes 14 is shown, but it is also possible to provide in each plane service organizer nodes 30 for managing the service of each plane, mediator nodes 12 for indicating the information of each plane, and network provider nodes 16 for providing the communication means of each plane.

In the first authoring tool provision plane 64, a tool developer node 75 provided with an information builder module 14a develops a content editing tool and outputs this to a tool component node 84 provided with an information server module 32a for an information server.

This content editing tool is downloaded at the consumer module 20a of the content authoring node 72. The content editing tool is installed in the information builder module 14a of the content authoring node 72 as a function of an editor by the application driver installer 220 shown in FIG. 9.

In the second authoring tool provision plane 65, a tool developer node 76 provided with an information builder module 14a develops a title editing tool and outputs this to a tool component node 85 provided with an information server module 32a for an information server.

This title editing tool is downloaded at the consumer module 20a of the content authoring node 73. The title editing tool is installed in the information builder module 14a of the service authoring node 73 as a function of an editor by the application driver installer 220 shown in FIG. 9.

In the consumer application plane 66, a consumer application developer node 77 provided with an information builder module 14a develops an application program and outputs this to an application node 86 provided with an information server module 32a for an information server.

This application program is downloaded at the consumer module 20a of the consumer node 74. The application program is installed in the consumer module 20a of the consumer node 74 by the application driver installer 220 shown in FIG. 9 as a function of an editor.

In the content authoring plane 61, as shown in FIG. 19, the consumer module 20a inputs stock data from the mono-media editor node 71 provided with the information builder module 14a via the stock server node 81. Note that, it is also possible to adopt a configuration where the mono-media editor node 71 stores the stock data in a magneto-optic disk or the like and transports this magneto-optic disk to the content authoring node 72 for loading so that the consumer module 20a inputs the stock data.

The consumer module 20a edits the input stock into the form of a program content. The content data after this editing is sent from the information builder module 14a to the content server node 82. In this way, the content authoring plane 61 is realized by utilizing a stock data provision service.

In the service authoring plane 62, as shown in FIG. 20, the consumer module 20a inputs the content data from the information builder module 14a of the content authoring node 72 via the content server node 82. Note that, it is also possible to adopt a configuration where the content authoring node 72 stores the content data on a magneto-optic disk or the like and transports this magneto-optic disk to the service authoring node 73 for loading so that the consumer module 20a inputs the content data.

This consumer module 20a edits the input content data as the title data by insertion of advertisements and editing of the control data for the biller and authenticator. The title data after this editing is sent from the information builder module 14a to the title server node 83.

In this way, the service authoring plane 62 is realized by utilizing a content provision service.

In the consumer service plane 63, as shown in FIG. 20, the consumer module 20a inputs the title data from the information contents provision module 14a of the service authoring node 73 via the title server node 83. Note that, it is also possible to adopt a configuration where the service authoring node 73 stores the content data on a magneto-optic disk or the like and transports this magneto-optic disk to the consumer node 74 for loading so that the consumer module 20a inputs the title data. In the consumer node 74, the input title data is utilized.

In this way, the consumer service plane 63 realizes a title provision service for the general consumers. These services are for example VOD or video shopping.

Below, an explanation will be made of the flow from the generation of the data to its processing (editing) and consumption.

First, the raw data from a camera or VTR is read into the media data database 512 shown in FIG. 3 of the information builder module 14a of the mono-media node 71 as the media data 515.

Next, the media sequence editor 516 shown in FIG. 3 edits the mono-media and produces the mono-media data (stock data). This mono-media data is stored in the media product database 521.

Next, this mono-media data is stored in the information server node 81 and then output to the consumer module 20a shown in FIG. 9 of the content authoring node 72, Next, the mono-media data is stored in the information builder module 14a shown in FIG. 3 of the content authoring node 72 as the media data 515 of the media data database 512, content editing is performed in the sequence generator 517, and the edited content data is stored in the media product database 521. At this time, the media sequence editor 516 performs the editing based on the content editing tool installed by the application driver installer 220 of the consumer module 20a shown in FIG. 9 of the content authoring node 72.

Next, this content data is stored in the information server node 82 and then output to the consumer module 20a of the service authoring node 73.

Next, the content data is stored as the media data 515 of the media data database 512 in the information builder module 14a shown in FIG. 3 of the service authoring node 73, title editing is performed in the sequence generator 517, and the edited title data is stored in the media product database 521. At this time, the media sequence editor 516 performs the editing based on the title editing tool installed by the application driver installer 220 of the consumer module 20a shown in FIG. 9 of the service authoring node 73.

Next, this title data is stored in the information server node 83 and then output to the consumer node 74 provided with the consumer module 20a shown in FIG. 9 where the processing based on the application program installed by the application driver installer 220 shown in FIG. 9 of this consumer module 20a is carried out.

The stock data provision service, the content provision service, and the title provision service mentioned above and the tool provision services of the authoring tool provision planes 64 and 65 and the application provision service of the consumer application provision plane 66 are applications of the multimedia service system of the configuration 1 of FIG. 1.

In the system of FIG. 18, it is possible for mediator nodes 12 to arrange cooperative and coordinated operation of service organizer nodes 30 and information server nodes 32 so as to provide a highly processed data stream to the consumer node 20. Further, the processing planes can share the processing tools.

Further, according to the system shown in FIG. 18, an application of the present invention, it is possible to construct an integrated application system from the generation of information to its delivery and consumption.

Note that the content authoring node 72 and the service authoring node 73 shown in FIG. 18 to FIG. 20 are realized by taking over the plurality of service execution modules shown in FIG. 12.

For example, the service authoring nodes 73 shown in FIG. 18 and FIG. 20 are realized by taking over the consumer service execution module 20a used in the service authoring plane 62 and the information builder service execution module 14a used in the consumer service plane 63 as shown in FIG. 21.

What is claimed is:

1. A multimedia network system wherein a plurality of data processing means transmit a plurality of types of data via a communication network, comprising:

information providing means for providing a first type of mediate information for indicating the contents of the data to be provided and data in accordance with request information from the communication network to another data processing means via the communication network;

service organizing means for providing the first type of mediate information for indicating the contents of the services which are provided and a service in accordance with the request information from the communication network to another data processing means via the communication network and controlling said information providing means;

mediating means for receiving the first type of mediate information provided by the information providing means and the service organizing means via the communication network and mediating the received first type of mediate information and a second type of mediate information containing information indicating the locations of the information providing means and the service organizing means to another data processing means via the communication network; and information consuming means for transmitting request information indicating the requested data and service or one of the requested data and service to another data processing means via the communication network based on the first type of mediate information and the second type of mediate information and the second type of mediate information autonomously provided by the information providing means, the service organizing means, and the mediating means, or based on the first type of mediate information and the second type of mediate information provided by the information providing means, the service organizing means, and the mediating means in accordance with a request of another data processing means and utilizing the data provided from one or more other data processing means via the communication network in accordance with the transmitted request information.

2. A multimedia network system as set forth in claim 1, wherein
the mediating means further mediates the request information received from the information consuming means via the communication network to the information providing means.

3. A multimedia network system as set forth in claim 1, wherein
two or more information providing means cooperate and constitute an information providing unit providing the data.

4. A multimedia network system as set forth in claim 3, wherein
the mediating means further mediates the data transmitted in an internal portion of an information processing unit and among information processing units.

5. A multimedia network system as set forth in claim 1, wherein
two or more service organizing means cooperate and constitute a service organizing unit providing a service.

6. A multimedia network system as set forth in claim 5, wherein
the mediating means further mediates the data transmitted in an internal portion of a service organizing unit and among service organizing units.

7. A multimedia network system as set forth in claim 1, wherein two or more mediating means cooperate and constitute a mediating unit mediating the second type of mediate information; and the mediating means constituting a mediating unit transmit the first type of mediate information and the second type of mediate information among themselves.

8. A multimedia network system as set forth in claim 1, wherein
two or more information consuming means cooperate and constitute a data utilization unit utilizing the data.

9. A multimedia network system as set forth in claim 1, wherein
the data processing means includes an information building means connected with the information providing means via the communication network and for generating the data to be provided by the information providing means via the communication network or directly.

10. A multimedia network system as set forth in claim 1, further comprising
a network providing means for controlling the communication of the communication network and providing the network connection among the data processing means.

11. A multimedia network system as set forth in claim 1, wherein
the plurality of data processing means provide at least one function among an information providing function, information consuming function, data mediation function, service organizing function, information building function, and network function.

12. A multimedia network system as set forth in claim 1, wherein said information consuming means receives from said service organizing means a program for transmitting said request information and/or for utilizing the data.

13. A method of multimedia communication for transmitting a plurality of types of data via a communication network among a plurality of nodes, comprising the steps of:

providing, by one or more nodes of the plurality of nodes, a first type of mediate information for indicating the contents of the data to be provided and data in accordance with request information from the communication network to one or more other nodes of the plurality of nodes via the communication network;

providing, by one or more nodes among the plurality of nodes, a first type of mediate information for indicating the contents of the service to be provided and service in accordance with the request information from the communication network to one or more other nodes of the plurality of nodes via the communication network;

receiving, by one or more nodes of the plurality of nodes, the provided first type of mediate information via the communication network and mediates the received first mediate information and a second type of mediate information containing information indicating the location of the node for providing the data and service to one or more other nodes of the plurality of nodes via the communication network; and transmitting, by one or more nodes of the plurality of nodes, request information indicating the requested data and service or one of the requested data and service to one or more other nodes of the plurality of nodes via the communication network based on the first type of mediate information and the second type of mediate information autonomously provided by the one or more nodes of the plurality of nodes or provided by one or more nodes of the plurality of nodes in accordance with a request of the one or more other nodes via the communication network in accordance with the transmitted request information.

14. A method of multimedia communication as set forth in claim 13, further comprising the step of mediating, by the node performing the mediation, the request information received from the node utilizing the data via the communication network to the node providing the data.

15. A method of multimedia communication as set forth in claim 13, further comprising the step of providing the data by two or more nodes cooperating and constituting an information providing unit.

16. A method of multimedia communication as set forth in claim 15, further comprising the step of mediating, by the node performing the mediation, the data transmitted in the internal portion of an information processing unit and among information processing units.

17. A method of multimedia communication as set forth in claim 13, further comprising the step of providing a service by two or more nodes cooperating and constituting a service organizing unit.

18. The method of multimedia communication as set forth in claim 17, further comprising the step of mediating, by the node performing the mediation, the data transmitted in the internal portion of a service organizing unit and among service organizing units.

19. A method of multimedia communication as set forth in claim 13, further comprising the steps of performing the mediation by two or more nodes cooperating and constituting a mediating unit for mediating the second type of mediate information; and transmitting the first type of mediate information and the second type of mediate information among nodes constituting a mediating unit.

20. A method of multimedia communication as set forth in claim 13, further comprising the step of utilizing the data by two or more nodes cooperating and constituting a data utilization unit.

21. A method of multimedia communication as set forth in claim 13, further comprising the steps of generating the data to be provided by the node providing the data via the communication network or providing the data directly by a node performing the data.

22. A method of multimedia communication as set forth in claim 13, further comprising the step of providing a network connection among nodes for controlling the communication of the communication network and performing the data processing by a network node as the node performing the data processing.

23. A method of multimedia communication as set forth in claim 13, further comprising the step of providing at least one function among an information providing function, information consuming function, data mediation function, service organizing function, information building function, and network function by the plurality of nodes performing the data processing.

24. A method of multimedia communication as set forth in claim 13, further comprising the step of receiving, from the one or more other nodes of the plurality of nodes, by said one or more nodes of the plurality of nodes which transmits the request information, a program for transmitting said request information and/or for utilizing the data.

25. A system of multimedia communication in which a plurality of types of data are transmitted via a communication network among a plurality of nodes, comprising:

one or more nodes of the plurality of nodes provide(s) a first type of mediate information for indicating the contents of the data to be provided and data in accordance with request information from the communication network to one or more other nodes of the plurality of nodes via the communication network;

one or more nodes of the plurality of nodes provide(s) a first type of mediate information for indicating the contents of the service to be provided and service in accordance with the request information from the communication network to one or more other nodes of the plurality of nodes via the communication network;

one or more nodes of the plurality of nodes receive(s) the provided first type of mediate information via the communication network and mediates the received first mediate information and the second type of mediate information containing information indicating the location of the node for providing the data and service to one or more other nodes of the plurality of nodes via the communication network; and one or more nodes of the plurality of nodes transmit(s) request information indicating the requested data and service or one of the requested data and service to one or more other nodes of the plurality of nodes via the communication network based on the first type of mediate information and the second type of mediate information autonomously provided by one ore more other nodes of the plurality of nodes or provided by one or more other nodes of the plurality of nodes in accordance with a request of one or more nodes of the plurality of nodes, utilizing the data provided from one or more other nodes of the plurality of nodes via the communication network in accordance with the transmitted request information.

* * * * *

UNITED STATES PATENT AND TRADEMARK OFFICE
CERTIFICATE OF CORRECTION

PATENT NO. : 5,966,386  
APPLICATION NO. : 08/810008  
DATED : October 12, 1999  
INVENTOR(S) : Hirotoshi Maegawa Page 1 of 1

It is certified that error appears in the above-identified patent and that said Letters Patent is hereby corrected as shown below:

On the Title page:

Item "(73)" "Digital Vision Laboratories Corp., Tokyo, Japan"

should read:

Item "(73)" --**Digital Vision Laboratories Corp., Tokyo, Japan  
Maegawa, Kazuyoshi, Mie, Japan**--

Signed and Sealed this

Twenty-eighth Day of October, 2008

JON W. DUDAS  
*Director of the United States Patent and Trademark Office*